(12) United States Patent
Bromley

(10) Patent No.: US 7,590,970 B2
(45) Date of Patent: *Sep. 15, 2009

(54) AUTOGENERATION OF CODE VIA HUMAN-MACHINE INTERFACES (HMI) AND SELF-BUILDING HMI

(75) Inventor: Clifton Harold Bromley, New Westminster (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/021,057

(22) Filed: Jan. 28, 2008

(65) Prior Publication Data

US 2008/0140230 A1 Jun. 12, 2008

Related U.S. Application Data

(63) Continuation of application No. 10/671,908, filed on Sep. 25, 2003, now Pat. No. 7,324,856.

(51) Int. Cl.
*G06F 9/44* (2006.01)
*G05B 11/01* (2006.01)
*G05B 15/00* (2006.01)

(52) U.S. Cl. .............. 717/106; 717/108; 717/116; 717/162; 717/163; 717/164; 717/165; 700/17; 700/83

(58) Field of Classification Search ............... 700/17, 700/83; 717/106, 108, 162–165
See application file for complete search history.

(56) References Cited

U.S. PATENT DOCUMENTS

| | | | |
|---|---|---|---|
| 5,551,030 A | 8/1996 | Linden et al. | |
| 6,326,147 B1 | 12/2001 | Oldham et al. | |
| 6,477,435 B1 | 11/2002 | Ryan et al. | |
| 6,559,773 B1 | 5/2003 | Berry | |
| 6,684,264 B1 | 1/2004 | Choi | |
| 7,139,687 B2 | 11/2006 | Eryilmaz et al. | |
| 7,146,231 B2 * | 12/2006 | Schleiss et al. | 700/83 |
| 7,146,241 B2 | 12/2006 | Kondo | |
| 7,200,448 B2 * | 4/2007 | Cachat et al. | 700/18 |
| 7,272,457 B2 * | 9/2007 | Glanzer et al. | 700/83 |
| 7,272,815 B1 * | 9/2007 | Eldridge et al. | 717/101 |
| 7,290,244 B2 * | 10/2007 | Peck et al. | 717/109 |
| 7,317,959 B2 * | 1/2008 | Pfander et al. | 700/97 |
| 7,324,856 B1 * | 1/2008 | Bromley | 700/86 |
| 7,340,314 B1 * | 3/2008 | Duncan et al. | 700/83 |
| 7,389,150 B2 * | 6/2008 | Inoue et al. | 700/17 |
| 7,421,438 B2 * | 9/2008 | Turski et al. | 707/100 |
| 2001/0019328 A1 | 9/2001 | Schwuttke et al. | |

(Continued)

OTHER PUBLICATIONS www.searchsmb.techtarget.com/sDefinition/0..sid44_gci212087,00.html.

(Continued)

*Primary Examiner*—Albert DeCady
*Assistant Examiner*—Jennifer L Norton
(74) *Attorney, Agent, or Firm*—Turocy & Watson LLP; Alexander R. Kuszewski

(57) ABSTRACT

A system that facilitates generation of code from a HMI representation of objects in an industrial automation environment. A component analyzes the HMI representation of objects, and a code generation component generates code based at least upon the analyzed HMI object.

20 Claims, 16 Drawing Sheets

U.S. PATENT DOCUMENTS

| | | | |
|---|---|---|---|
| 2002/0120921 A1* | 8/2002 | Coburn et al. | 717/140 |
| 2003/0033037 A1 | 2/2003 | Yuen et al. | |
| 2003/0045950 A1 | 3/2003 | Bronikowski et al. | |
| 2003/0097189 A1 | 5/2003 | Melzer | |
| 2004/0098148 A1 | 5/2004 | Retlich et al. | |
| 2004/0104986 A1 | 6/2004 | Nito et al. | |
| 2004/0131361 A1 | 7/2004 | Bischoff | |
| 2004/0260518 A1* | 12/2004 | Polz et al. | 702/188 |
| 2005/0119871 A1 | 6/2005 | Deffler | |
| 2005/0257204 A1 | 11/2005 | Bryant et al. | |
| 2006/0026267 A1 | 2/2006 | Godin et al. | |
| 2006/0173863 A1 | 8/2006 | Paulus et al. | |
| 2007/0168065 A1* | 7/2007 | Nixon et al. | 700/97 |
| 2007/0265716 A1* | 11/2007 | Ohashi | 700/83 |
| 2007/0276514 A1* | 11/2007 | Martinez et al. | 700/80 |

OTHER PUBLICATIONS

The American Heritage College Dictionary; Houghton Mifflin Company; 2002 4th edition; p. 309.

Scott E. Hudson. "User Interface Specification Using an Enhanced Spreadsheet Model", 1194, 30 pages.

* cited by examiner

AUTOGENERATION OF CODE VIA HUMAN-MACHINE INTERFACES (HMI) AND SELF-BUILDING HMI

CROSS-REFERENCE TO RELATED APPLICATION

This application is a continuation of U.S. patent application Ser. No. 10/671,908, filed Sep. 25, 2003 and entitled AUTOGENERATION OF CODE VIA HUMAN-MACHINE INTERFACES (HMI) AND SELF-BUILDING HMI, the entirety of which is incorporated herein by reference.

TECHNICAL FIELD

The present invention relates to controlling automated devices via human-machine interfaces. More particularly, the invention relates to a system and/or methodology facilitating automatic generation of control code utilizing function objects within a HMI.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, ControlNet, DeviceNet or other network protocols and also communicate to higher level computing systems. Generally, industrial controllers utilize the aforementioned technologies along with other technology to control, cooperate and communicate across multiple and diverse applications.

Imperative to factory automation are human-machine interfaces (HMIs), which facilitate safe and efficient interaction between humans and machinery, wherein manipulation and control of complex and/or expensive systems comprising such machinery occurs via a computer. For example, in an industrial setting, a press operator can utilize a HMI to start and/or stop such press via depressing a key on a keyboard. In other embodiments, the press can be started and/or stopped through clicking a computer mouse or selecting a virtual button on a touch screen. Furthermore, HMIs can be utilized to manipulate and/or control particular actions of a process (thereby controlling individual components associated with the process). For instance, a HMI can enable a press operator to accelerate a press via a keystroke, rather than temporarily halting operation of the press and adjusting parameters of individual components required for accelerating such press.

Typically, expert computer programmers are employed to design and implement HMIs in connection with particular systems and/or processes. Creation of effective HMIs not only requires designing a user-interface (e.g., a graphical interface displayed on a monitor, textual instructions, . . . ), but also requires generating code for each component and/or action desirably controlled and/or manipulated via a HMI. For example, interface code must be created to interface components and/or actions with corresponding software renderings (HMI objects and arrangement of HMI objects) representing such components and/or actions, and code controlling each component (control code) must be generated to enable component(s) to operate desirably. Such interface and control codes can thereby effectuate desirable operation of component(s) in an automated industrial environment, and further allow components to respond appropriately to operator commands delivered to such components via a HMI.

Costs, including programming, latency, inefficiency, etc., increase with machinery and/or process complexity. Specifically, in an industrial setting, programming interface code and control code via a HMI can require several hours, and in some instances days, resulting in machine latency and industrial inefficiency, as machines otherwise capable of normal use are rendered inactive. Furthermore, machines and/or processes dependent upon inactive machine(s) and/or processes must also be temporarily inhibited from normal operation.

In addition, programmers generating interface code and control code effectuated within a HMI for control of particular industrial systems and/or processes are typically not operators of such systems and/or processes. Therefore, after programming of interface code and control code within a HMI has been completed, a system and/or process operator can discover that the code does not facilitate efficient and intuitive operation of machinery, requiring the operator to locate and contact the programmer to edit such code according to specific requests from the operator. Often, a skilled computer programmer must edit interface code and control code several times before effective automation within an industrial environment via HMIs is achieved, thus creating additional expenses.

In view of at least the above, there exists a strong need in the art for a system and/or methodology facilitating improved code generation and/or editing via HMIs.

SUMMARY OF THE INVENTION

The following presents a simplified summary of the invention in order to provide a basis understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention facilitates graphically generating code that governs actions of components within industrial systems and/or processes, and overcomes many of the aforementioned deficiencies related to conventional systems and/or methodologies for automating an industrial environment via human machine interfaces (HMIs). The subject invention employs a graphical display to enable arranging of functional representations of components and/or actions (HMI objects) into graphical representations of industrial systems and/or processes. Code governing operation of the represented system and/or process (control code) can thereafter be automatically generated and relayed to components of the system comprising processing devices, such as a programmable logic controller (PLC). Such graphical representation can be later refined upon alterations of components within a system and/or variations in actions of a process, and control code can be automatically generated based upon the modified graphical representation. The present invention thereby enables an industrial system and/or process operator, not skilled in computer programming but familiar with such system and/or process, to customize control code necessary for industrial automation.

HMI objects can represent components within an industrial system, such as a pump, as well as actions within an industrial process (e.g., velocity of a conveyor). A HMI object comprises a particular graphical representation interfaced to a corresponding component and/or action, as well as underlying code utilized to interface components and/or actions to other components and/or actions. Providing graphical representation(s) of HMI object(s) facilitates visually constructing a system and/or process, complete with associations between components and/or actions—a task less complicated than associating components and/or actions to create an industrial system and/or process via computer code. Such visually constructed system and/or process can be utilized to generate control code to govern actions of the system and/or process.

In accordance with one aspect of the present invention, an operator (or contracted programmer) skilled in computer programming can create HMI objects via creating code and associating such code to a particular graphical representation of an industrial component and/or action. Alternatively, templates can be provided to facilitate creation of HMI objects by operators not skilled in computer programming. The templates can employ fields corresponding to component and/or action parameters, wherein an operator familiar with a component and/or action desirably represented by a HMI object can populate the fields with parameters of the component and/or action. Upon populating the fields, the template can be saved as a HMI object, for example, in a library comprising of a plurality of HMI objects. Moreover, templates can employ graphical representations of HMI objects, thereby enabling a user to control an output HMI object graphically as well as parametrically (e.g., visual aspects of a resulting HMI object, such as size, shape, and color, can be determined). For example, sequencing of operations can be controlled graphically via utilizing templates.

Furthermore, templates can be utilized in connection with the present invention to generate arrangements of multiple HMI objects (in addition to individual HMI objects). For instance, templates can comprise arrangements of disparate templates (e.g., links or references to other templates), thereby generation of complex templates that describe complex arrangements of HMI objects to be created via arranging multiple templates. In accordance with another aspect of the present invention, HMI objects created via templates can include a historical component that links the HMI object to the template that was employed to generate the HMI object. The historical component can thereafter propagate alterations to a template to HMI objects generated via the template, thereby allowing several HMI objects to be updated automatically by simply altering a parent template. Such historical component facilitates reduction in manual labor previously required to update HMI objects. Furthermore, it is to be understood that instances may occur when a user simply desires to update a template without updating HMI objects created via the template. In such instances the historical component can be disabled, thereby enabling individual updates of a template.

In accordance with another aspect of the present invention, components of a system and/or process comprising sufficient intelligence and/or memory can facilitate self-creation of HMI objects. For instance, an industrial component can comprise a processing device holding relevant information regarding the component (e.g., component identity, connected components, component parameters . . . ). The processing device can comprise sufficient intelligence to enable relay of necessary information to a HMI object generator in accordance with one aspect of the present invention. Alternatively, component(s) comprising memory—the memory storing information regarding the component(s)—can be interrogated for information necessary to create HMI object(s) representing the component(s). Moreover, a graphical representation of an industrial system and/or process can be automatically generated based upon components likewise automatically generated. For example, memory of component(s) can comprise system and/or process information, such as component location, adjacent component(s), etc., sufficient to enable self-generation of a graphical representation of the system and/or process.

In accordance with another aspect of the present invention, existing HMI objects can be edited by a computer programmer. For example, a computer programmer can select an existing HMI object and be provided with code underlying the HMI object. The computer programmer can modify such code in accordance with variations in component(s) and/or action(s) within system(s) and/or processes. The edited HMI object can be saved in a library comprising various HMI objects and integrated into a graphical representation of a system and/or process. Alternatively, a template comprising modifiable fields corresponding to component and/or action parameters can be provided. Such template facilitates HMI object editing by an operator not skilled in computer programming, but familiar with a component and/or action graphically represented by a desirably modified HMI object. Templates are especially desirably in occurrences of component upgrades, wherein an obsolete component is replaced with a similar upgrade component comprising disparate parameters. Simply modifying the parameters can effectuate generation of a HMI object corresponding to the upgrade component.

In accordance with another aspect of the present invention, two or more HMI objects can be combined as a single HMI object, thereby reducing visual clutter on a graphical display. An operator can select two or more HMI objects arranged together, and thereafter associate such arrangement with a graphical representation and save the HMI object in a library for later utilization and/or editing.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
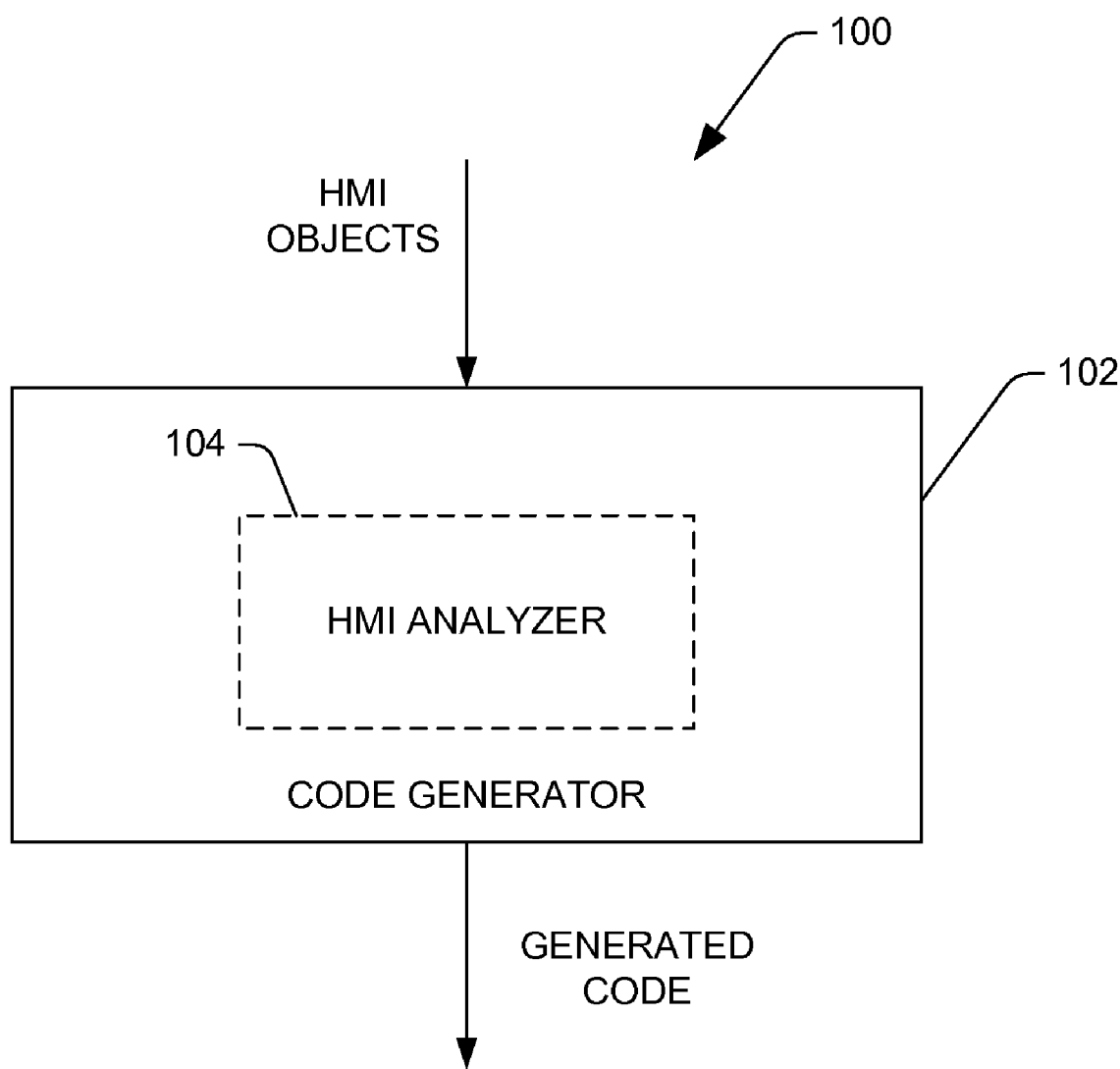
FIG. 1 is a block diagram of a code generating system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

The subject invention can incorporate various inference schemes and/or techniques in connection with effecting a user interface for object management and manipulation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Referring now to the drawings, FIG. 1 illustrates a high-level system overview in connection with one particular aspect of the subject invention. The present invention relates to a novel system for generating control code within a HMI utilizing functional HMI objects (e.g., graphical representations of components and/or actions within an industrial system and/or process). Code generating system 100 facilitates enabling an industrial system and/or process operator to design and implement an automated system and/or process without requiring expert programming skills. The system 100 comprises a code generator 102 that includes a HMI analyzer 104. The HMI analyzer 104 facilitates analysis of HMI objects. HMI objects are graphical representations of industrial system components and/or actions of corresponding industrial system components and/or process actions. Furthermore, HMI objects can be associated with control code (e.g., code governing actions of system components) corresponding to particular graphical representations of components and/or actions. For instance, a HMI object representing actions relating to a pump can be a graphical rendering of a pump, and code for governing operation of such pump can be dedicated to the graphical depiction of the pump. HMI objects can include but are not limited to graphical representations of system components and/or functional descriptions of a methodology. For example, an image of a valve as well as a functional block describing actions desirably taken by a valve can be HMI objects in accordance with an aspect of the present invention. The HMI objects can be stored and displayed in a location accessible by a user for editing, arranging, and manipulation. For example, a library of HMI objects can be displayed on a monitor via a HMI and stored within a data store (not shown).

In accordance with one aspect of the present invention, HMI objects are created by an individual skilled in computer programming (e.g., a computer programmer scripts code for each component and/or action represented by a HMI object). Furthermore, templates can be employed to facilitate creating desired HMI objects by a system and/or process operator not skilled in computer programming. Such templates can be provided to intuitively provide an operator with fields for effectively facilitating creation of a desired HMI object. Alternatively, components comprising a system and/or process controlled via a HMI can comprise sufficient intelligence and/or memory to facilitate self-creation of HMI objects. For example, a machine component can be equipped with a processing device including memory, wherein the memory is populated with sufficient information to facilitate self-creation of HMI objects (e.g., memory associated with a particular component can include component parameters, components connected to the subject component, processes utilizing such component, . . . ). Communicating such component parameters to the system 100 enables generation of HMI objects representing such components and/or actions of components. Moreover, the system 100 can employ artificial intelligence means to interrogate device memory and create particular HMI objects, wherein given a particular user state and context the system 100 can infer which HMI objects, as well as type of HMI object, to create (e.g., an object representing a component, an action, a process, . . . ). A communication protocol defined by a component can also be employed in connection with interrogating the component regarding such component's parameters, capabilities, operating environment, etc. Such a communication protocol can be particularly beneficial when employed in connection with intelligent devices. Upon creation, HMI objects can be stored in a data store (not shown) and displayed in a library for later use.

According to one aspect of the present invention, a display region on a display screen facilitating HMI object analysis and generation of control code can receive a plurality of HMI objects from a data store or library comprising such HMI objects, wherein the plurality of HMI objects can be arranged to functionally represent a particular system and/or process. For example, an operator desiring a process to consist of a valve opening followed by drilling and pressing can graphically represent such a process via arranging HMI objects describing acts of such process. In another example, arranging HMI objects representing components of an industrial system can graphically represent relationships between such components within the system.

The HMI analyzer 104 analyzes an arrangement of HMI objects, and relays the arrangement of HMI objects to a code generator 102, which facilitates creating control code based at least in part upon the analysis. For example, the HMI analyzer 104 can identify components necessary for implementing a method desirably effectuated by a user within a system, review related components and parameters of HMI objects comprising a HMI arrangement, determine feasibility of implementing such an arrangement into control code, etc. If a generated arrangement of HMI objects cannot be implemented within a system, the HMI analyzer 104 can deliver an error message to an operator. For example, an operator may design a methodology desirably effectuated within a system, wherein such methodology is incompatible with components comprising the system. Moreover, an instance can occur when designed HMI object(s) comprise parameters not matching parameters of corresponding component and/or action.

The control code created by the generating component 102 can be relayed to machine components comprising a processing unit utilized for instructing operation of such components. For example, programmable logic controllers (PLCs) can be employed to control manufacturing devices and/or processes via control code. The control code created by the code generator 102 can be stored in memory of a PLC and can be executed by the PLC in a sequential manner, although instruction jumping, looping, interrupt routines and multiple threads of execution, for example, are also common. In accordance with one particular aspect of the subject invention, ladder diagrams (code format compatible with most PLCs) can be generated by the code generator 104. It is to be understood, however, that utilization of a PLC and ladder diagrams is merely exemplary, and is not meant to be limiting in any manner as other processors and/or controllers as well as other programming languages and/or formats are contemplated and intended to fall within the scope of the hereto appended claims. For instance, the code generator 104 can also generate function block diagrams, structured text, instruction lists, and sequential function charts.

The subject invention enables an industrial system and/or process operator to graphically represent such system and/or process via a HMI, and further implements such graphical representation via generating control code, thereby substantially mitigating prior art deficiencies which require expert computer programmers to generate code regarding processes and/or systems of which they are unfamiliar. Therefore, industrial automation can be efficiently and inexpensively achieved, as an operator of a system and/or process can design code that governs such system and/or process (e.g., an operator familiar with a system can design control code that governs actions of the system). In accordance with another particular aspect of the present invention, in an instance where a desired component and/or act has not been dedicated as a HMI object, such component and/or act can be scripted by a programmer and assigned as a HMI object. For example, a programmer can create control code regarding an action of a pump, and dedicate such code as a HMI object that can be utilized by a machine operator to graphically represent a process utilizing such pump. Furthermore, control code underlying a HMI object can be edited and re-dedicated as a HMI object (either identical or disparate from the original HMI object). Enabling editing and dedicating of HMI objects ensures that the system 100 can be flexible as components and/or actions of an industrial system and/or process vary (e.g., system 100 does not need to be replaced when industrial processes change or systems are updated). Moreover, two or more HMI objects can be combined into a single HMI object to simplify an operator's graphical representation of a system and/or process. For example, a plurality of HMI objects created and arranged to represent a particular process can be combined into a single HMI object and saved in a library of HMI objects for later and repeated use. The combined HMI object can thereafter be fragmented into the original HMI objects at an operator's discretion.

A HMI utilized in conjunction with the subject invention can be a fixed HMI, for example, such as a graphical interface on a stationary monitor used in conjunction with a personal and/or industrial computer. According to another example, the HMI can be a tethered portable HMI, such as the Machine Terminal MT750 or the Guard Terminal G750, both manufactured by Allen-Bradley. A tethered portable HMI offers several advantages over the fixed HMI, the most important being increased mobility to manually inspect the plant floor with the HMI in hand, thus permitting increased productivity. For example, an operator using a tethered portable HMI can respond to alarms and/or adjust machine settings with the HMI in hand. Increased mobility further enables greater troubleshooting capability and reduced set up time.

According to another example, the HMI comprising the subject invention can be a wireless HMI, wherein the term "wireless HMI" is meant to encompass any mobile computing device utilized in connection with wireless network communication (e.g., laptops, tablets, PDAs, . . . ). A wireless HMI offers even greater mobility than the tethered portable wireless, and its range can be extended by distributing additional base stations throughout a large plant. In this manner, an operator can access information regarding a given machine and control the machine from any point in the plant. Furthermore, several wireless computing devices operate on a thin client platform, which permits facilitated integration to new or extant control architectures. By utilizing this technology, the wireless computing device can act as a thin client to computer applications. Because communication with a server occurs via a network link, this aspect of the present invention advantageously reduces hardware and software costs.

Figure 2:
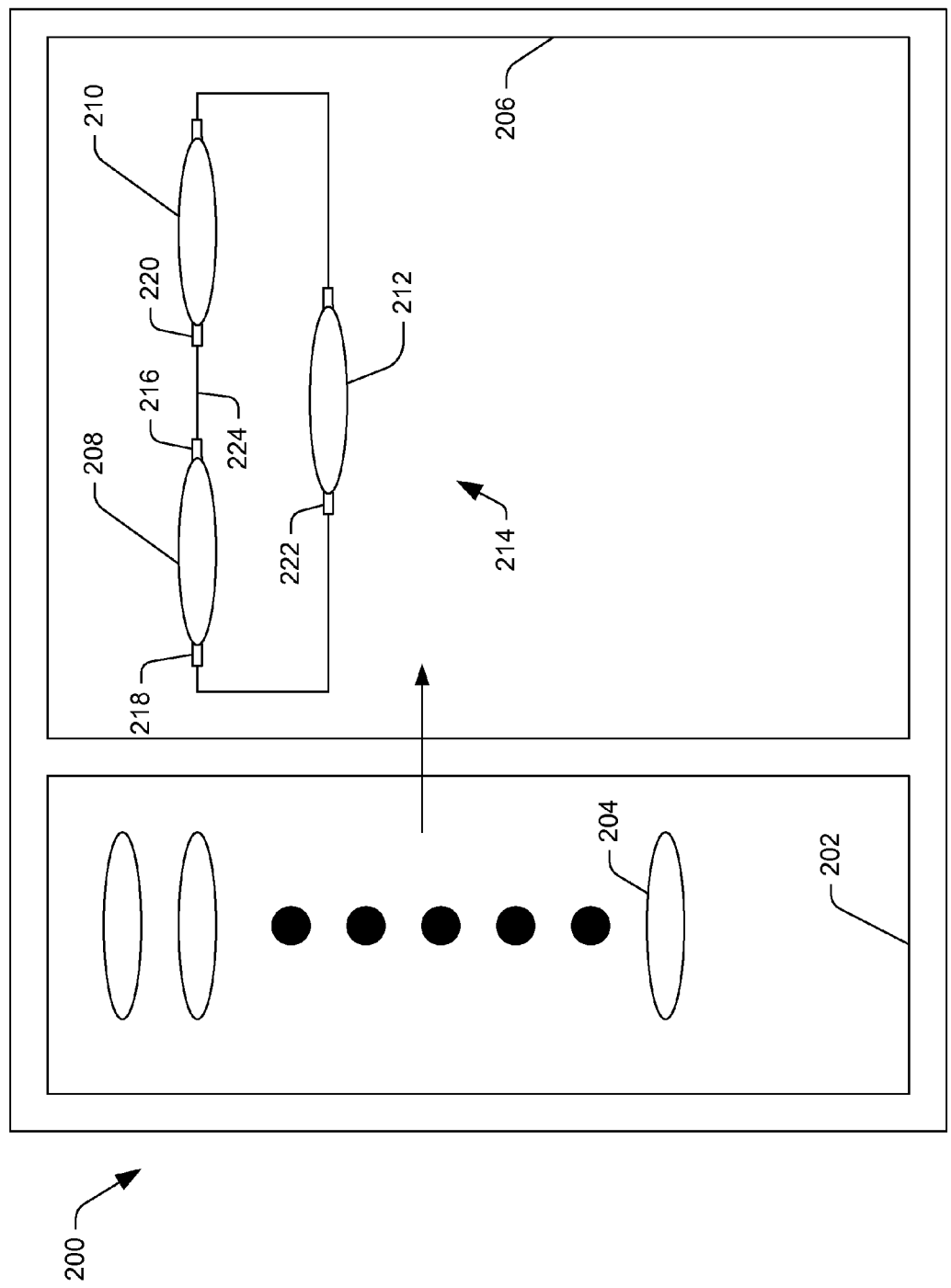
FIG. 2 is an exemplary graphical display illustrating an arrangement of HMI objects in accordance with an aspect of the present invention.

Turning now to FIG. 2, an exemplary graphical display 200 (e.g., displayed on computer monitor, television screen, portable monitor, . . . ) facilitating arrangement of HMI objects representing a particular system is illustrated. The display 200 comprises an exemplary library 202 of differing HMI objects available to enable creating a graphical representation of a system. The library 202 comprises N HMI objects, wherein HMI object 204 represents the Nth HMI object, and each HMI object represents different components of a system. The display 200 further comprises an arrangement region 206 to enable an operator to configure HMI objects to graphically represent a desired system.

In the illustrated example of FIG. 2, HMI objects 208, 210, and 212 are arranged by an operator to graphically represent an industrial system, wherein control code for governing actions and/or components represented by the arrangement can be desirably generated by a code generator 102 (FIG. 1) based at least in part on such arrangement. The arrangement can be created via operator selection and transfer of HMI objects from the HMI library 202 to the configuration section 206. The HMI objects can be selected and transferred via mouse, keystrokes, touch screens, or any other suitable manner for selecting and transferring objects. HMI objects can be provided with input/output ports corresponding to inputs and outputs of a machine component that a particular HMI component represents, thus enabling an operator to easily generate a graphical representation of a system. For example, HMI object 208 can comprise an input 216 and an output 218, wherein the input 216 is connected to an output 220 of HMI object 210, and the output 218 is connected to an input 222 of HMI object 212. Display 200 can further comprise a connection portion (not shown) which can include means of connecting HMI objects, such as connection 224 between the input 216 of HMI object 208 and the output 220 of HMI object 210. While the exemplary objects 208, 210 and 212 are illustrated with one input and one output, respectively, graphical representations of system components that include a plurality of inputs and/or outputs falls within the scope of the present claims.

Upon completion of the graphical representation 214, the configuration section 206 can relay the graphical representation 214 to the HMI analyzer 104 and the code generator 102 (FIG. 1) to generate control code for a system corresponding to the graphical representation 214. An operator can communicate to the arrangement region 206 that the graphical representation 214 is complete via mouse, keystrokes, touch screen, or any other suitable manner of communicating to the arrangement region 206 that the graphical representation 214 is complete. System automation can therefore be enabled without requiring an expert computer programmer to generate control code for a system.

Figure 3:
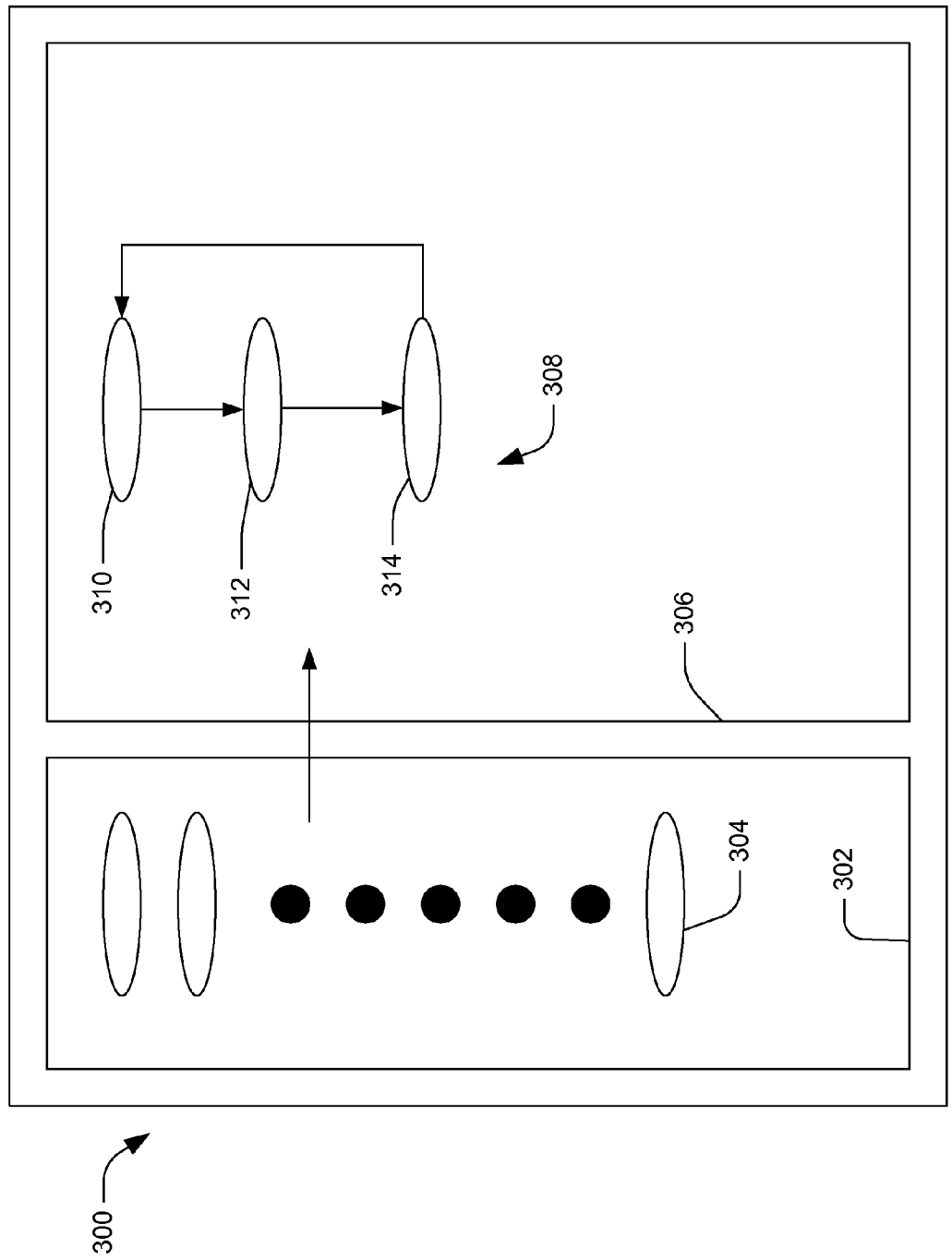
FIG. 3 is an exemplary graphical display illustrating an arrangement of HMI objects in accordance with an aspect of the present invention.

Regarding FIG. 3, an exemplary graphical display 300 facilitating arrangement of HMI objects representing a particular methodology is illustrated. The display 300 comprises an exemplary library 302 of differing HMI objects available to create a graphical representation of a methodology. The library 302 includes N HMI objects, wherein HMI object 304 represents the Nth HMI object, and each HMI object represents generic functional descriptions of a methodology. The display 300 further comprises an arrangement region 306 enabling operator configuration of HMI objects to graphically represent a desired methodology.

Exemplary method 308, comprising HMI objects 310, 312, and 314, which represent particular acts of a methodology, can be created by selecting particular HMI objects from the library 302 and transferring such HMI objects to the arrangement region 306. The HMI objects 310, 312, and 314 comprising the methodology 308 can be associated with one another via any suitable connecting means. Upon communicating to the configuration section 306 that a desired methodology has been created utilizing HMI objects, the HMI analyzer 104 and the code generator 102 (FIG. 1) can create control code for facilitating automation of component actions required for an industrial process to operate according to the desired methodology. While FIGS. 2 and 3 illustrate exemplary displays comprising HMI objects that represent components of a system and acts of a methodology, respectively, a display can comprise a combination of both HMI objects representing system components and HMI objects representing acts of a methodology.

Figure 4:
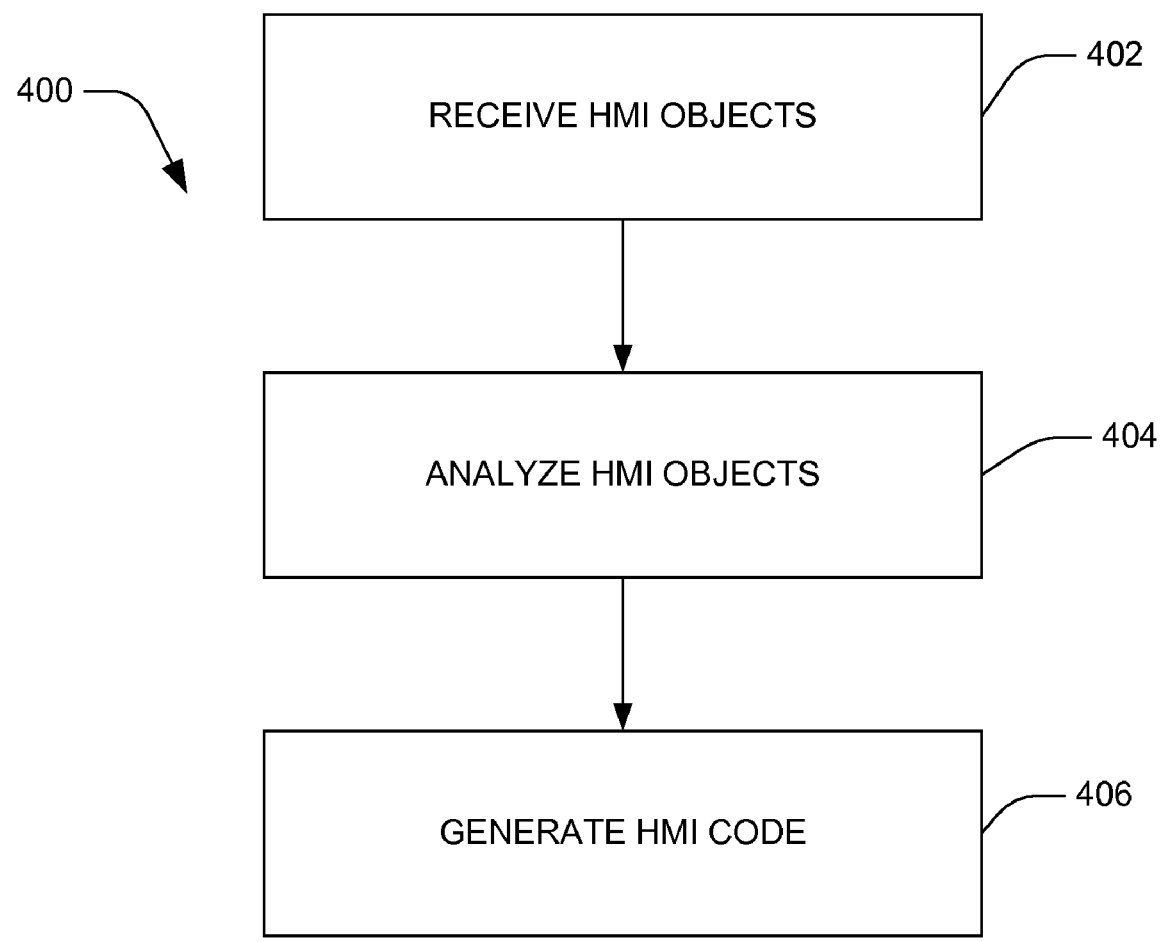
FIG. 4 is a representative flow diagram illustrating generation of control code in accordance with an aspect of the present invention.

Turning now to FIG. 4, a methodology 400 for generating code from a HMI representation of a system and/or process is illustrated. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 402, a graphical arrangement of HMI objects representing a system and/or process is received by a component capable of analyzing such arrangement. The arrangement can be created by an operator utilizing a library of HMI objects and means to associate such HMI objects (e.g., connecting apparatuses). Alternatively, artificial intelligence techniques can be utilized to facilitate generating an arrangement of HMI objects based upon user state, context, and other extrinsic data. For example, given a particular user, a determination can be made regarding creation of a graphical representation by reviewing components within a system and prior graphical representations generated by the user.

At 404, the arrangement of HMI objects is analyzed (e.g., components necessary for implementing a method can be identified, related components of HMI objects can be reviewed, feasibility of implementing such arrangement into control code, . . . ). Error messages can occur, if upon analysis, an arrangement of HMI objects desirably effectuated within a system is found infeasible. At 406, control code is generated based in part upon the analysis. The control code can be generated in C, C++, C#, Java, HTML, XML, perl, etc. and can be formatted in any suitable manner (e.g., ladder logic, . . . ). Generated code can be relayed to system components comprising a suitable processing device (e.g., a PLC, microprocessor, . . . ). Various processing devices can act conjunctively to facilitate operability of a system and/or process application via controlling one or more machine component(s).

In accordance with one aspect of the present invention, intelligent components can be employed to enable control code to be automatically generated in a desirable programming language, and thereafter automatically compiled into executable code suitable for a given processing device. Alternatively, the type of control code to be generated can be selected by a user and thereafter automatically compiled according to knowledge of type of processing device that will utilize the control code. Furthermore, disparate languages and/or executable code formats can be selected for different HMI objects and/or different portions of a control system under development. Such intelligent components enable support for new programming languages and/or processing devices to be added without requiring entire systems to be upgraded to new versions (e.g., a new intelligent component can simply be added).

In accordance with another aspect of the present invention, intelligent components can be utilized to output a universal language that can be translated into any desirable programming language and/or executable code for known processing devices. The universal language mitigates a requirement to output a same portion of control code numerous times. Rather, the control code can be output a single time, and thereafter converted to any desirable programming language and/or executable code. Furthermore, pre-configured HMI objects and/or control strategies can be supplied to a system in the universal language, thereby allowing use of the HMI objects in any end system regardless of particular programming language(s) and processing device(s) utilized by the system.

Generated code can be associated with a graphical representation of HMI objects and saved in a data store, thereby alleviating a potentially necessary re-generation of the same code later in time. For example, a system and/or process operator can create a particular arrangement of HMI objects, utilized to facilitate generating control code corresponding to such particular arrangement, and the subject invention can relay the control code to components comprising a processing device, as well as concurrently save the generated control code in a data store. Through saving the generated control code and corresponding particular arrangement of HMI objects, the code can be employed to control operation of a system and/or process after reconfiguration of a processing device (e.g., after changing processing devices, control code alterations, . . . ). Furthermore, associating a HMI arrangement with generated control code facilitates simplistic editing for similar processes, thereby enabling an operator lacking expert programming skills to quickly alter code controlling an industrial system and/or process. For example, an operator can add and/or remove HMI objects to and/or from a HMI arrangement corresponding to generated control code, and thereafter generate control code based on the edited arrangement of HMI objects.

Figure 5:
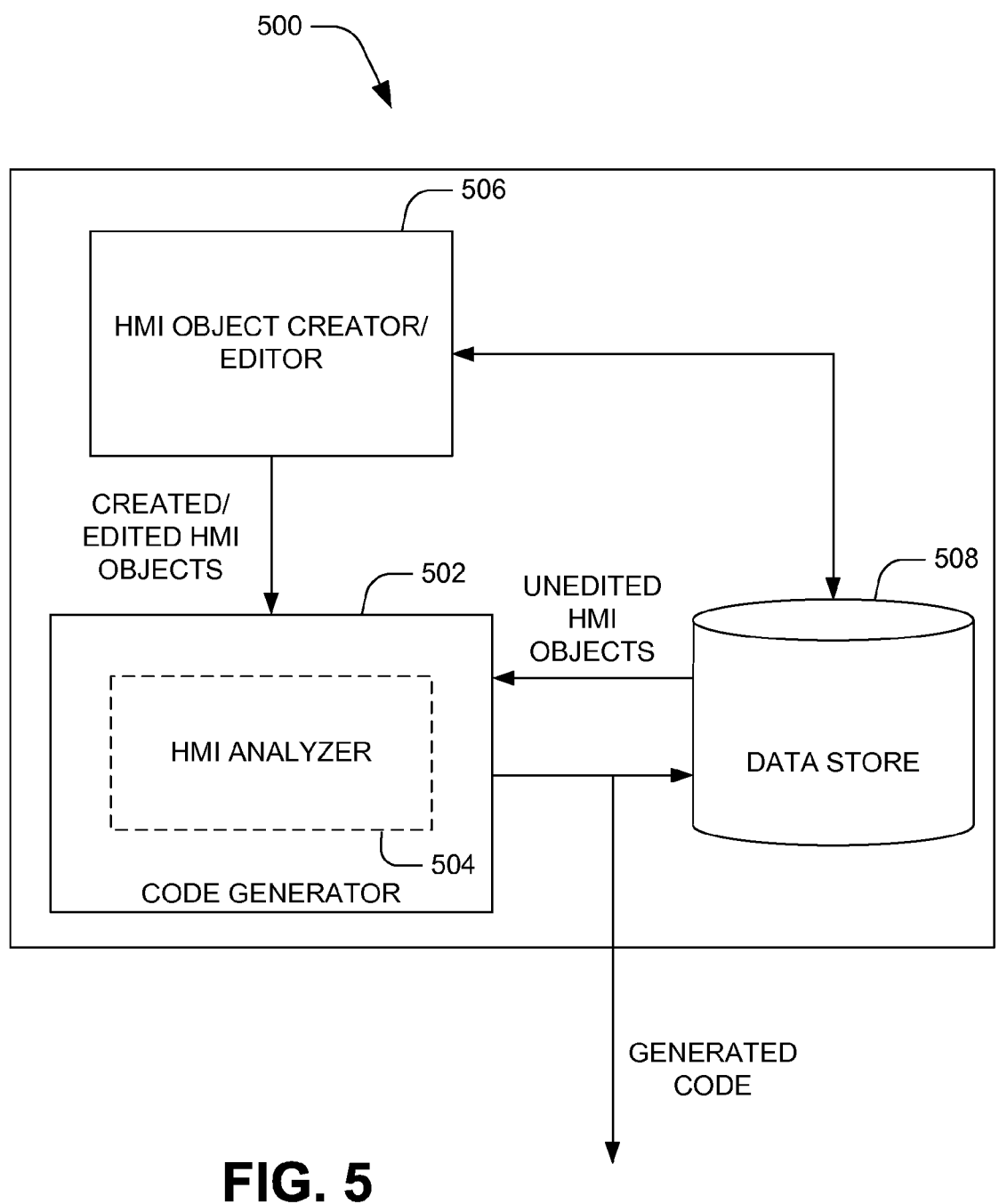
FIG. 5 is a block diagram of a code generating system wherein HMI objects can be created and/or edited in accordance with an aspect of the present invention.

Turning now to FIG. 5, a system 500 utilizing created and/or edited HMI objects to generate control code is illustrated. The system 500 includes a code generator 502 comprising a HMI analyzer 504. The HMI analyzer 504 receives arrangements of HMI objects, and analyzes such arrangement to ensure feasibility. The code generator 502 can then create control code corresponding to the arrangement of HMI objects received by the HMI analyzer 504.

The system 500 further comprises a HMI object creator/editor 506, which facilitates creating new HMI objects and/or editing existing HMI objects located in a data store 508. New HMI objects can be created by a user sufficiently skilled in computer programming, wherein a HMI object can be coded utilizing any suitable program language and a corresponding graphical representation of the HMI object can be associated with such code, thereby creating a HMI object. Alternatively, a template can be provided, thus allowing a user not skilled in computer programming to populate fields within the template corresponding to component and/or action parameters. The created objects can be stored in the data store 508 for later use, and arranged together with existing and/or edited HMI objects to create a graphical representation of a control system and/or process. Allowing creation of HMI objects facilitates flexibility in system and/or process design, and further enables consumers to augment an existing system and/or process with additional components and/or acts without necessitating purchase of an upgraded HMI.

Moreover, the HMI object creator/editor 506 facilitates editing of existing HMI objects. In accordance with one aspect of the present invention, an operator skilled in computer programming can directly access and edit code underlying HMI objects (e.g., editing code corresponding to a graphical representation of a component and/or act results in editing of a HMI object). Alternatively, a template can be utilized to effectuate editing of a HMI object. For example, upon selection of a HMI object via a selecting device (e.g., a mouse, keystrokes, touchscreen, . . . ), a template comprising a plurality of alterable fields that define parameters of a component and/or act represented by the HMI object can be provided. An operator lacking expert programming skills can thereafter desirably alter such fields to effectively create a new HMI object. Templates utilized for editing HMI objects are typically most useful during occurrences that a component and/or act is slightly modified (e.g., an obsolete component is replaced with an upgrade component comprising similar parameters). Furthermore, the HMI object creator/editor 506 facilitates a multi-user development environment. For example, two or more operators at differing locations can act in conjunction with one another to desirably edit a HMI object.

Figure 6:
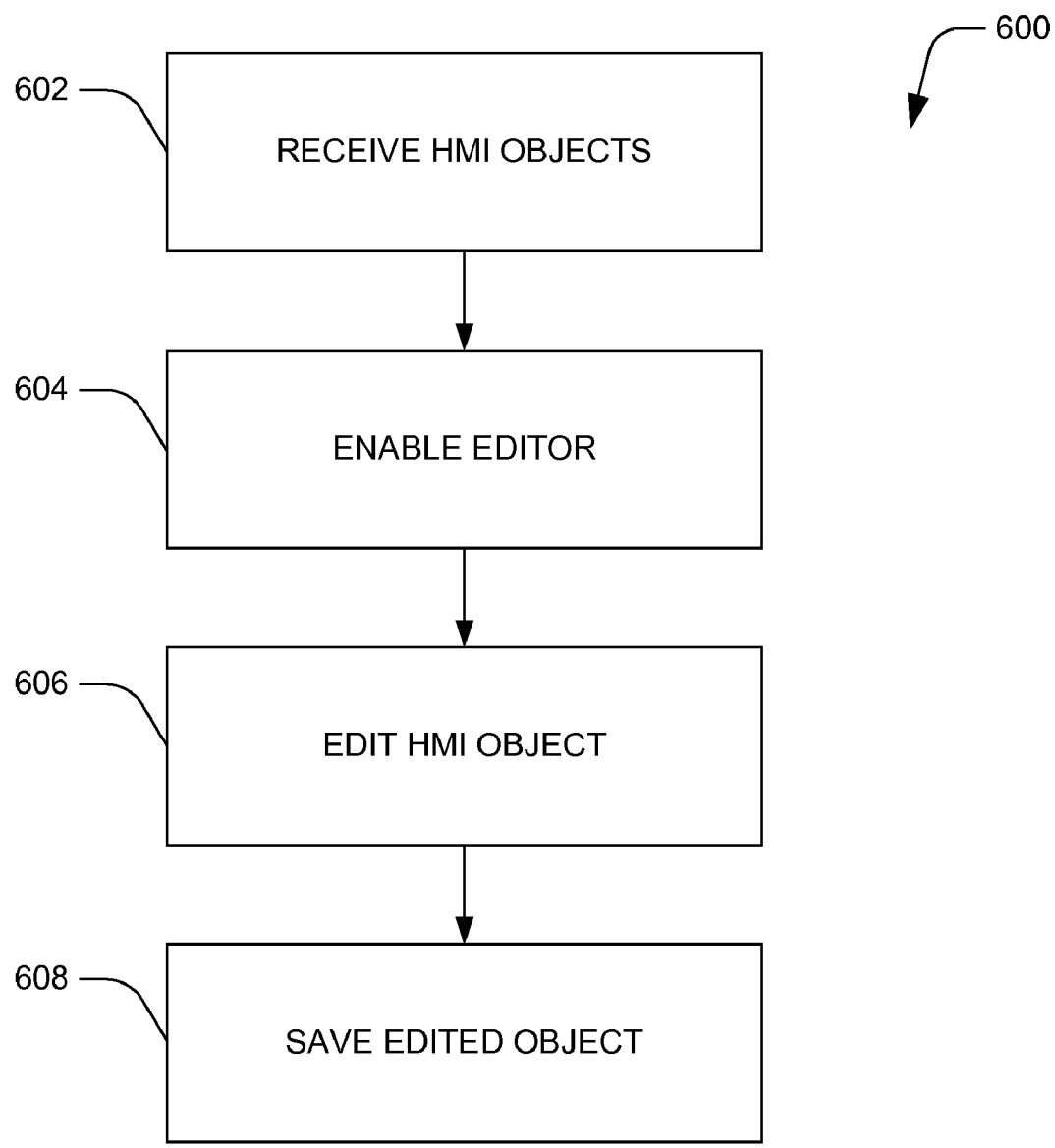
FIG. 6 is a flow diagram for editing HMI objects in accordance with an aspect of the present invention.

Now regarding FIG. 6, a methodology 600 for editing HMI objects is illustrated. At 602 HMI objects are received. In accordance with one aspect of the present invention, a library of HMI objects is stored in a data store. Alternatively, industrial components can include processing devices comprising sufficient intelligence and/or memory allowing for self-creation of HMI objects (e.g., processing devices can relay sufficient component parameters thereby allowing a HMI to infer a HMI object). At 604, a HMI object editor is enabled. In accordance with one aspect of the present invention, a graphical display on a display device can illustrate such editor via selecting a HMI object utilizing a selecting device (e.g., mouse, keystrokes, touch screen, . . . ). Moreover, a HMI object editor can be an entirely disparate application, thereby requiring an operator to initialize the editor separate from a HMI.

At 606, HMI object(s) are edited. In accordance with one aspect of the present invention, code underlying a particular HMI object can be accessed and modified within a HMI object editor, thus editing the HMI object. Alternatively, a HMI object editor can present a template comprising modifiable fields that define parameters of a component and/or action represented by a HMI object, thereby facilitating HMI object editing by an operator not skilled in computer programming (e.g., an operator can alter parameters within a template). At 608, edited HMI objects are saved, allowing later utilization and/or editing of modified HMI objects. For example, saved HMI objects can be included in a HMI object library, wherein an operator can select such HMI objects for inclusion in an arrangement of HMI objects representing a system and/or process. Thereafter the arrangement can be utilized to facilitate generating control code and relaying such code to components comprising processing devices, thereby governing components and/or actions components of systems and/or processes.

Figure 7:
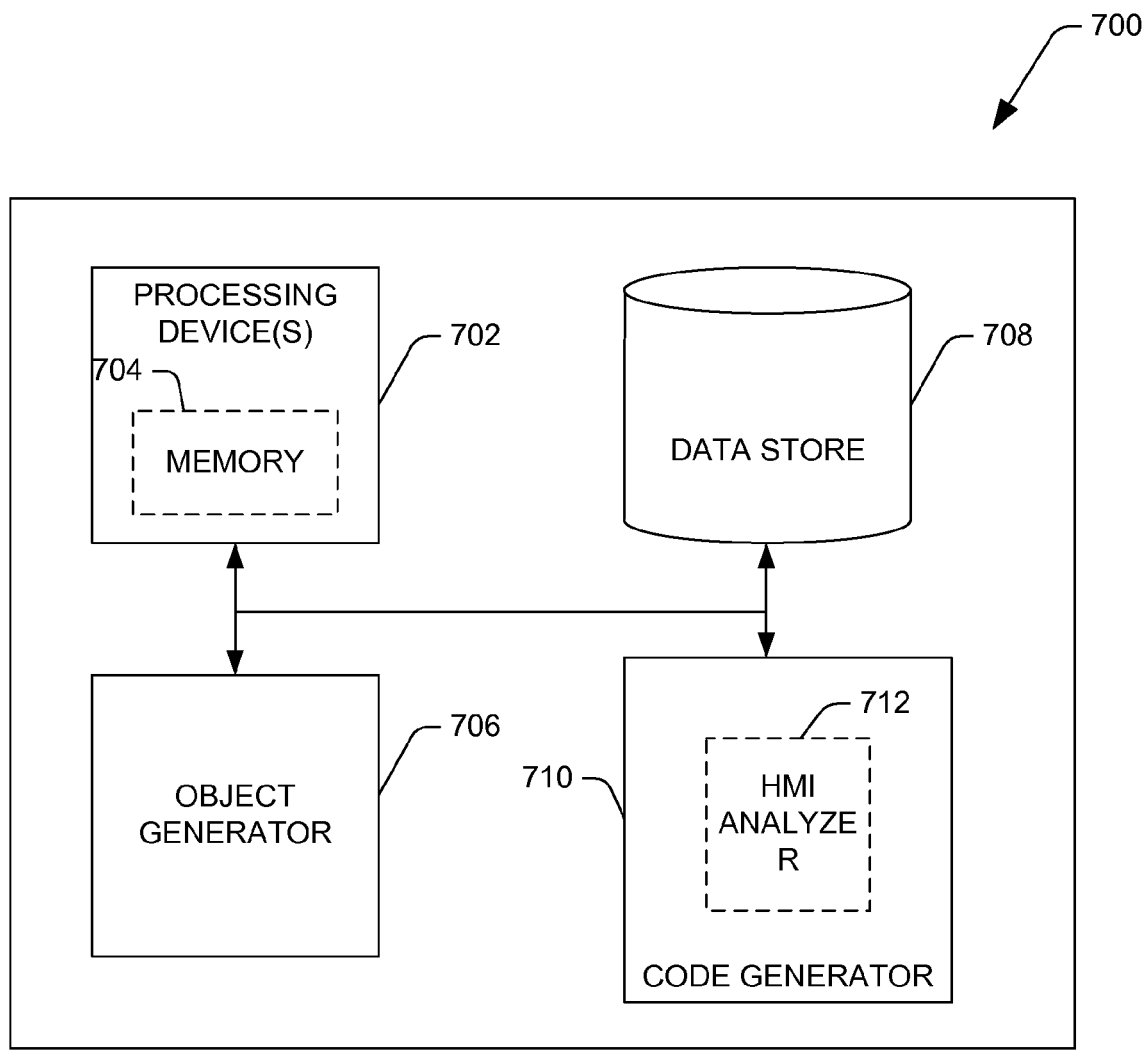
FIG. 7 is block diagram of a system for automatically generating HMI objects in accordance with an aspect of the present invention.

Turning now to FIG. 7, a system 700 facilitating self-generation of HMI objects is illustrated. System 700 comprises processing device(s) 702 including memory 704, an object generator 706, a data store 708, and a code generator 710 comprising a HMI analyzer 712. The processing device(s) 702 include memory 704 that stores data sheets associated with component information, such as component identity, surrounding components, actions of the component, systems including such component, etc. In accordance with one aspect of the present invention, the component information within the memory 704 of the processing device(s) is automatically relayed to the object generator 706, which utilizes such component information to generate HMI objects and/or arrangements of HMI objects representing an industrial system and/or process. For example, the object generator can receive information from a plurality of components comprising a system, and utilize such information to facilitate creation of HMI objects representing such plurality of components, as well as generate an arrangement of such HMI objects thereby graphically representing the system comprising such components. Plug-and-play technologies, as well as other similar methodologies, can be utilized to automatically relay component information to processing device(s). Furthermore, the component information and generated HMI object(s) and/or arrangements(s) can be relayed to the data store 708 for later utilization.

In accordance with another aspect of the present invention, the object generator 706 can employ various artificial intelligence techniques to interrogate the processing device(s) 702 and/or arrange generated HMI object(s) to represent a system and/or process. For instance, the object generator 706 can request information from the processing device(s) 702 to identify a component, and based upon results of the request can interrogate such processing device(s) 702 as well as other processing devices with particular inquiries necessary to facilitate creation of a HMI object and/or arrangement of HMI objects. Such particular inquiries can reduce bandwidth required for generating HMI objects and/or arrangements, reduce traffic on a system bus, increase manufacturing efficiency, etc. The object generator 706 can also utilize artificial intelligence techniques to generate an arrangement of HMI objects based on operator state and context. For example, an individual operator may retain security clearance to operate particular systems within specific areas. The object generator 706 can therefore determine the operator identity and location together with available components to create an arrangement of HMI object(s) available to the particular operator.

The generated HMI object(s) and/or arrangement(s) of HMI object(s) can thereafter be delivered to the code generator 710 comprising the HMI analyzer 712. The HMI analyzer 712 can determine feasibility of such object(s) and/or arrangement(s), wherein if such object(s) and/or arrangement(s) are infeasible, a message can be relayed to the object generator 706 to create different HMI object(s) and/or arrangements. Otherwise, the code generator 710 can generate control code facilitating governing of actions of a system and/or process represented by HMI object(s) and/or arrangement(s) and relay such control code to components comprising the processing devices 702. Moreover, the code generator 710 can relay control code to the data store 708 for later utilization and/or editing.

Figure 8:
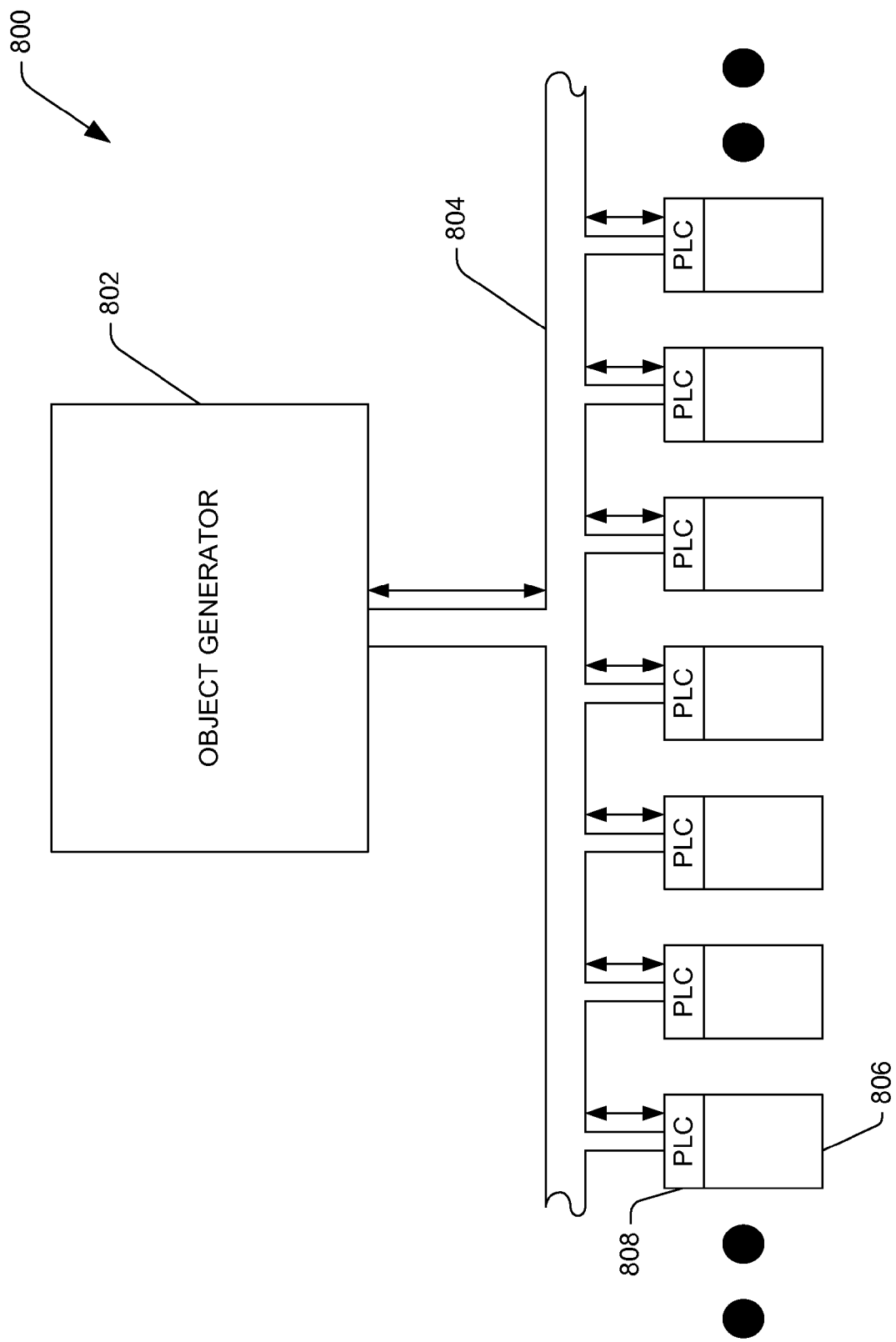
FIG. 8 is an exemplary block diagram of a network of components in conjunction with an object generator in accordance with an aspect of the present invention.

Turning now to FIG. 8, an exemplary system 800 of components comprising intelligent automation devices is illustrated. While for purposes of explanation programmable logic controllers (PLCs) are illustrated as the intelligent automation devices, it is to be understood that such intelligent automation devices can be valves, sensors, actuators, drives (motors), and any other suitable intelligent automation devices. System 800 comprises an object generator 802 for creating HMI objects based at least in part upon information obtained from processing devices. System 800 comprises a plurality of components 804, wherein each component includes a PLC 806. While system 800 illustrates PLCs 806 as processing devices employed to control actions of the components 804, any suitable processing device can be utilized within the scope of the subject claims (e.g., microprocessors, various microcontrollers, . . . ).

The system 800 facilitates communication between the PLCs 806 and the object generator via a data bus 808—such bus utilizing any suitable connection employable to relay data. For example, a cable connection, wireless connection, Ethernet connection, etc. can all be utilized as a data bus to facilitate communication between PLCs 806 and the object generator 802. The PLCs comprise memory that includes component information (e.g., component identification, connected components, component actions, . . . ). In accordance with one aspect of the present invention, a plurality of PLCs within the system 800 can relay information regarding components 804 to the object generator 802, thereby enabling the component generator 802 to create HMI objects representing such components 804 and/or systems and/or processes comprising the components 804. In accordance with another aspect of the subject invention, the object generator 802 can employ artificial intelligence techniques to interrogate the PLCs 806, resulting in obtaining requisite information for creating HMI objects representing the components 804. Furthermore, the object generator 802 can infer systems and/or processes comprising components 804 via reviewing operator state and context, system and/or process state and context, as well as other extrinsic data.

Figure 9:
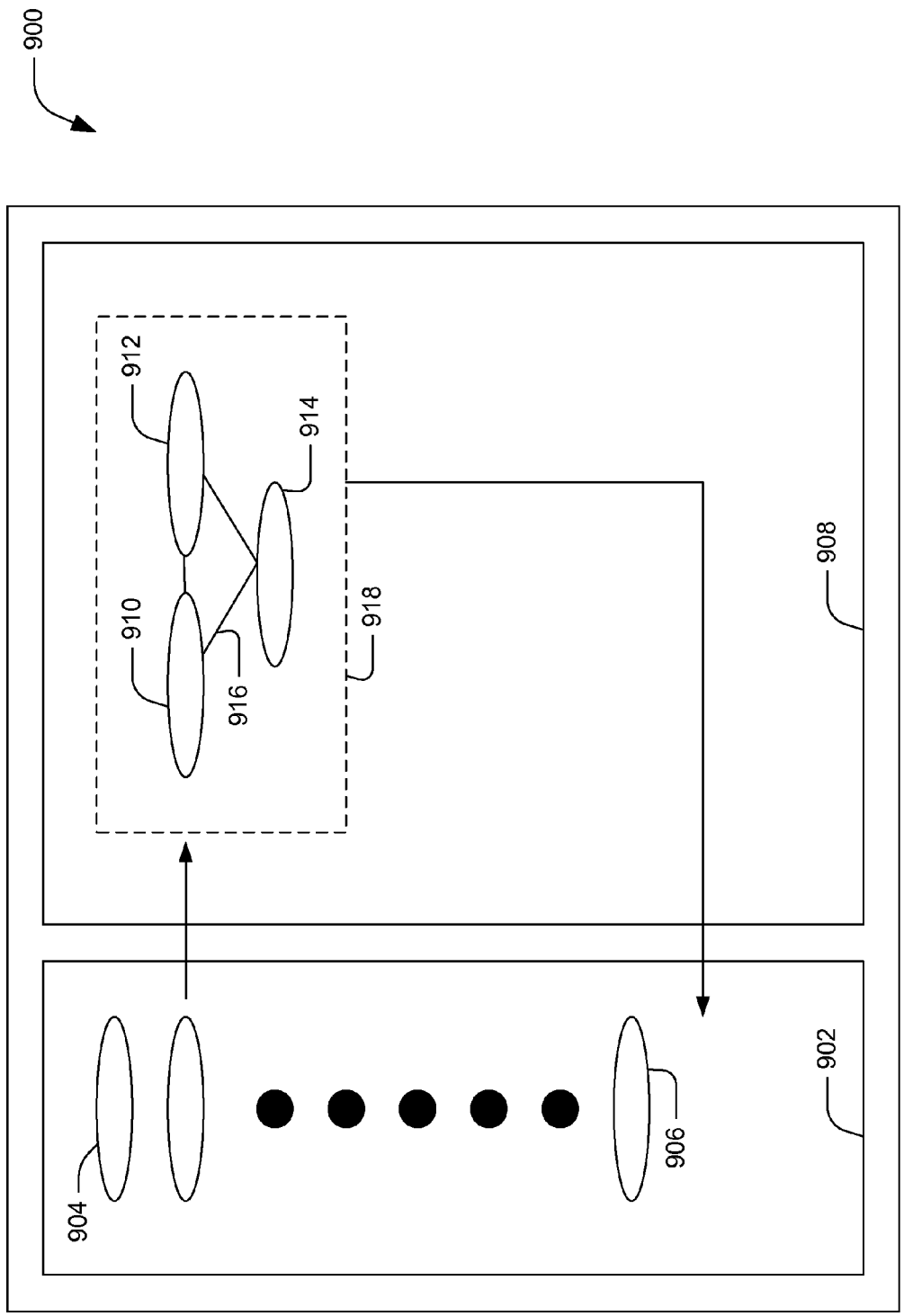
FIG. 9 is an exemplary graphical display illustrating combination of two or more HMI objects into a single HMI object in accordance with an aspect of the present invention.

Now regarding FIG. 9, an exemplary graphical display 900 facilitating effectively grouping a plurality of HMI objects into a single HMI object is illustrated. Display 900 comprises a library 902 of N HMI objects, wherein HMI object 904 is the first HMI object and HMI object 906 is the Nth HMI object. It is to be understood that while display 900 displays a library comprising HMI objects, any suitable means for storing and/or displaying HMI objects is within the scope of the hereto appended claims. An operator can select HMI objects from the library 902 and place the HMI objects into an arrangement region 908 via any suitable selection means (e.g., mouse, keystrokes, touch screen, . . . ).

As illustrated in exemplary display 900, an operator has selected HMI objects 910, 912, and 914 from the library 902 and transferred the HMI objects 910-914 into the arrangement region 908. It is to be understood, however, that transferal of the HMI objects 910-914 to the arrangement region 908 does not remove the HMI objects 910-914 from the library 902. Rather, the particular HMI objects 910-914 can remain available for additional use in the arrangement region 908 and/or in later arrangements of HMI objects. Furthermore, HMI objects 910-914 have been graphically affiliated with one another via connecting means 916. In accordance with one aspect of the present invention, a library of connecting means (not shown) is provided, thereby allowing an operator to select an appropriate connecting means to affiliate two or more HMI objects. Alternatively, artificial intelligence means can be provided to effectuate graphical relationships between two or more HMI objects based on operator state and context, as well as other extrinsic data (e.g., proximity of HMI objects to one another). In combination, HMI objects 910-914 create a single assemblage 918 of HMI objects.

An operator can inform a HMI that the assemblage 918 of HMI objects is desirably created via any suitable selecting means (e.g., selecting all HMI objects desirably in the assemblage 918). Upon creation of the assemblage 918, the operator can name and store the assemblage 918 into the library 902 as a single HMI object, thereby alleviating visual confusion that can occur upon presence of numerous HMI objects. The operator-defined HMI object (e.g., the assemblage 918) can be utilized in a larger arrangement of HMI objects, which represents a system and/or process, and delivered to a code generator, wherein control code is created to govern actions of components within such system and/or process. Furthermore, the operator-defined HMI object can be removed and/or edited to add and/or remove HMI objects, change parameters, etc. In accordance with one aspect of the present invention, a new template can also be generated via creating an operator-defined HMI object.

Figure 10:
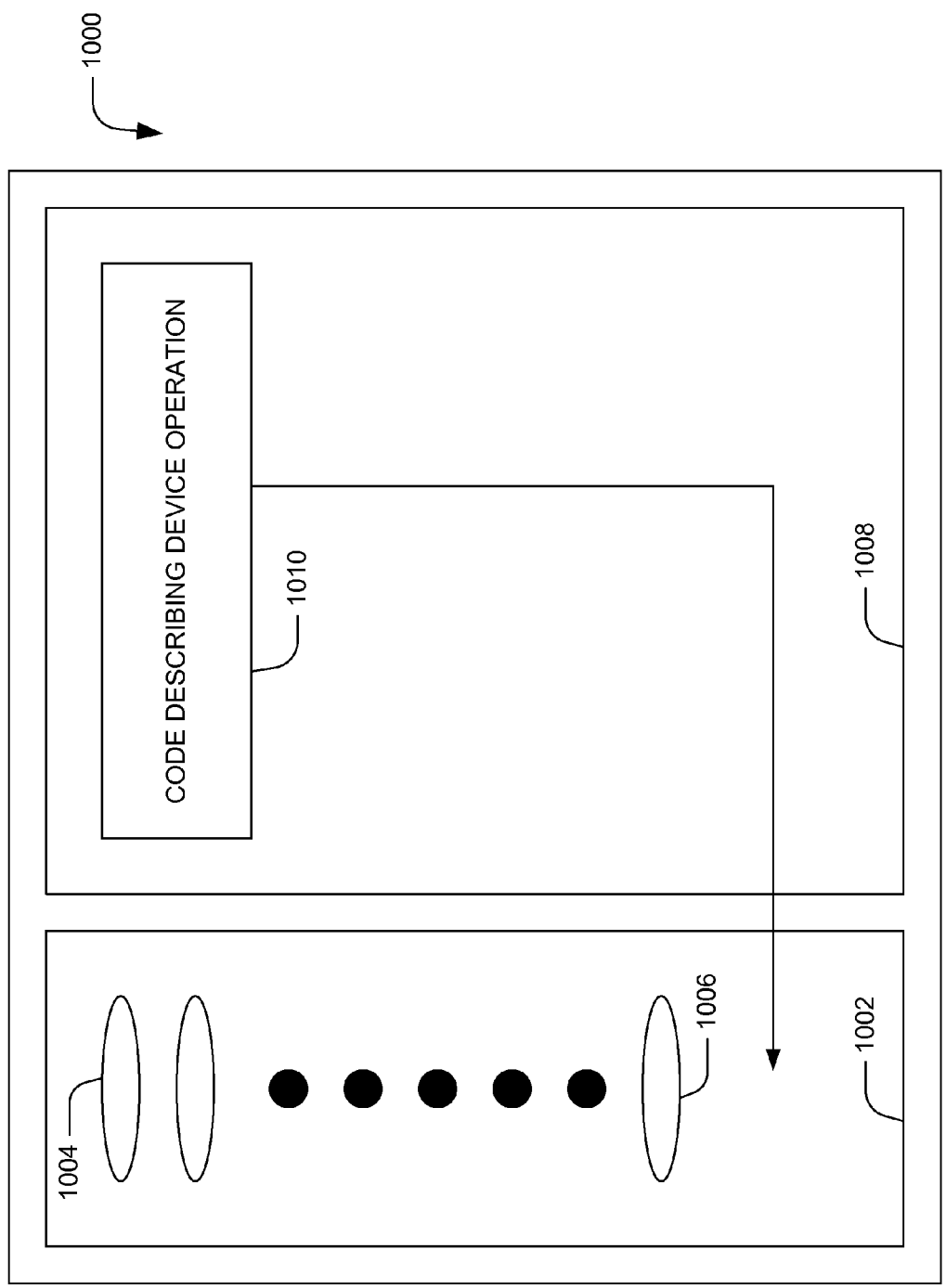
FIG. 10 is an exemplary graphical display illustrating HMI object creation in accordance with an aspect of the present invention.

Turning now to FIG. 10, an exemplary graphical display 1000 facilitating operator-creation of a HMI object is illustrated. Graphical display 1000 comprises a library 1002 of N HMI objects, wherein HMI object 1004 is the first HMI object and HMI object 1006 is the Nth HMI object. Graphical display 1000 further comprises a creating region 1008, which facilitates creating a HMI object representing an act and/or component via operator programming. For example, a component and/or act can be added to a system and/or process, wherein a HMI object representing such additional component and/or act does not presently exist within a HMI. The present invention enables an operator to create and name a HMI object representing a component and/or act within the creating region 1008, thereby enabling a HMI to represent relevant components and/or acts within a system and/or process.

A field 1010 can be provided to facilitate creating code underlying a HMI object. The code can written in any suitable language (e.g., C, C++, Fortran, Java, C#, Visual Basic, Sequential Function Charts, Structured Text, Function Blocks . . . ) and any suitable format (e.g., ladder logic). Furthermore, a graphical representation of the code populating field 1010 can be named and stored in the library 1002 for later utilization and/or editing. For example, code underlying a created HMI object can be presented in an editing region (not shown) thereby allowing an operator to change parameters, configurations, etc. to maintain consistency with variations in components and/or acts represented by such HMI object. Furthermore the created HMI object can be utilized in an arrangement of HMI objects in connection with other HMI objects and relayed to a generating component (not shown), thereby facilitating creation of control code to govern actions of a system and/or process represented by such arrangement of HMI objects.

Figure 11:
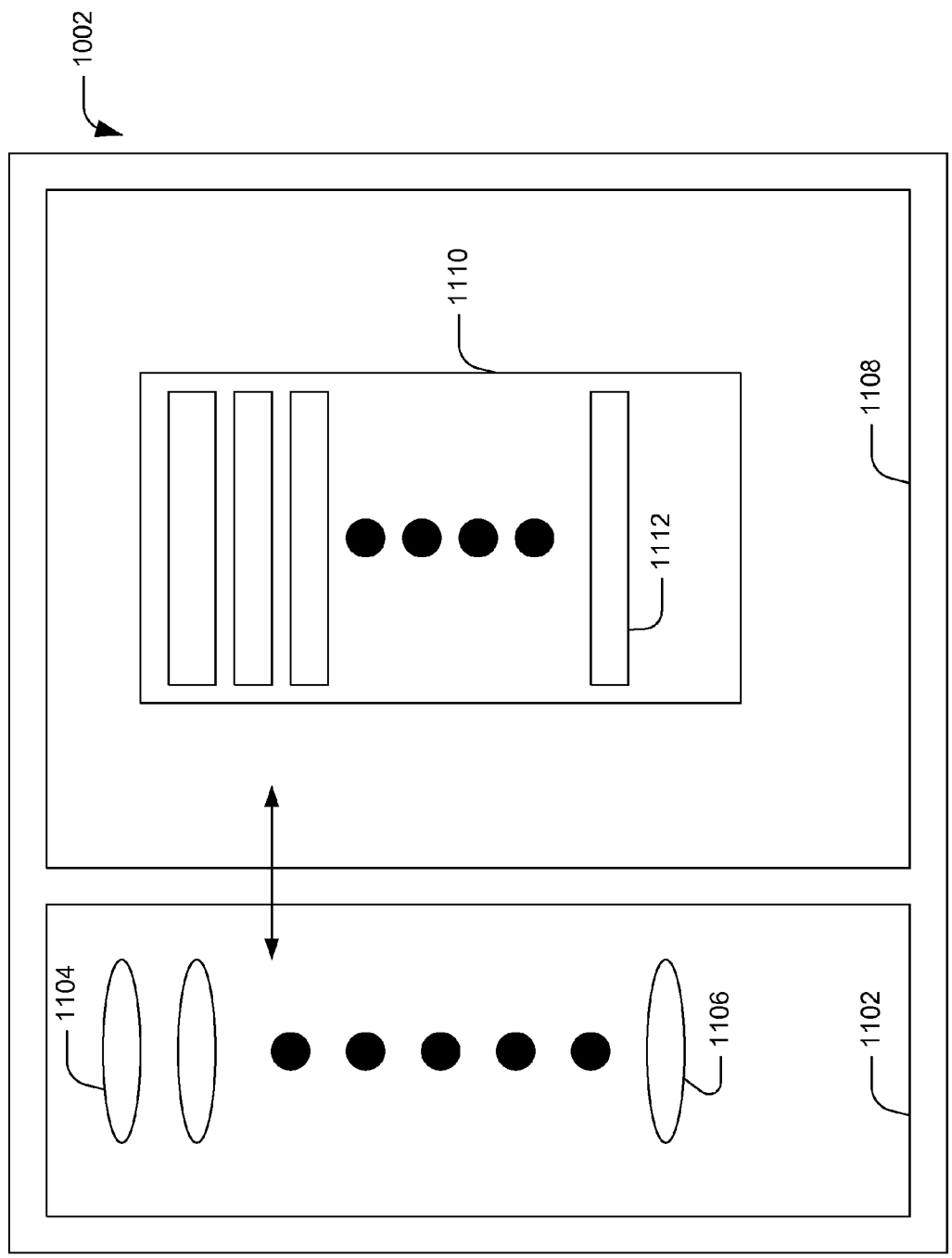
FIG. 11 is an exemplary graphical display illustrating HMI object creation in accordance with an aspect of the present invention.

Now regarding FIG. 11, an exemplary graphical display 1100 facilitating creation of a HMI object via a template is illustrated. Display 1100 comprises a library 1102 of N HMI objects, wherein HMI object 1104 is the first HMI object and HMI object 1106 is the Nth HMI object. Display 1100 further comprises a creating region 1108, which provides a template 1110 to facilitate operator-creation of a HMI object representing a component and/or act within a system and/or process without requiring the operator to be skilled in computer programming. The template 1110 comprises a plurality of fields 1112—each field 1112 representing a parameter of a component and/or act. An operator can populate each field to create a new HMI object representing a component and/or act, as well as name and store such HMI object in the library 1102 for later utilization and/or editing.

While FIG. 11 illustrates generation of the template 1110 parametrically (e.g., populating particular fields with parameters), it is to be understood that the template 1110 can be generated utilizing graphical components, thereby enabling a user to control an output HMI object graphically as well as parametrically (e.g., visual aspects of a resulting HMI object, such as size, shape, and color, can be determined). For example, sequencing of operations can be controlled graphically via utilizing templates.

Furthermore, the template 1110 can be created to generate arrangements of multiple HMI objects (in addition to individual HMI objects). For instance, the template 1110 can comprise arrangements of disparate templates (e.g., links or references to other templates), thereby generating a complex template 1110 that describe complex arrangements of HMI objects 1104-1106 to be created via arranging multiple templates (not shown). In accordance with another aspect of the present invention, HMI objects 1104-1106 created via the template 1110 can include a historical component (not shown) that links the HMI objects 1104-1106 created by the template 1110 to the template 1110. The historical component can thereafter propagate alterations to the template 1110 to the HMI objects 1104-1106, thereby allowing several HMI objects 1104-1106 to be updated automatically by simply altering the parent template 1110. Such historical component facilitates reduction in manual labor previously required to update the HMI objects 1104-1106. Furthermore, it is to be understood that instances may occur when a user simply desires to update the template 1110 without updating HMI objects 1104-1106 created via the template 1110. In such instances the historical component can be disabled, thereby enabling the template 1110 to be updated without consequence to the HMI objects 1104-1106 created via the template 1110.

An additional library (not shown) comprising a plurality of templates can be employed, wherein each template can be customized to represent general components and/or acts. For example, a template can be provided specifically for creation of a press—each field of the template being relevant to presses (e.g., press size, compression power, . . . ). Furthermore, an operator can create a customized template if a component and/or act not present at the creation of a HMI becomes pertinent to operation of a system and/or process.

Figure 12:
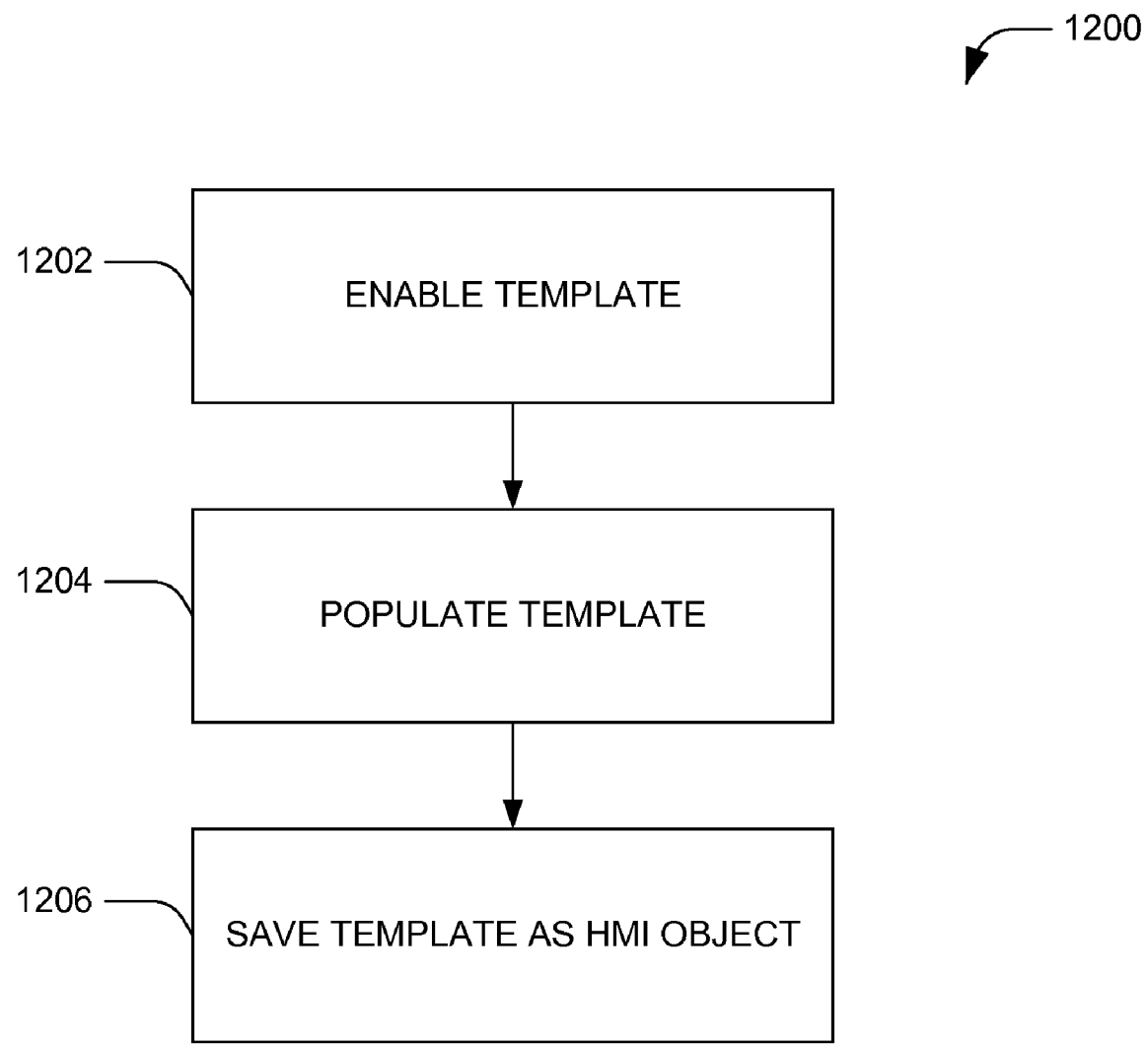
FIG. 12 is a flow diagram for creating HMI objects via a template in accordance with an aspect of the present invention.

Turning now to FIG. 12, a methodology 1200 for creating a HMI object via a template is illustrated. At 1202 a template is enabled. In accordance with one aspect of the present invention, separate templates exist for specific components and/or acts within a system and/or process. For example, a template can be provided specifically for a press. Typically, a template comprises several fields desirably altered by an operator, thereby facilitating operator-creation of a HMI object without requiring the operator to be skilled in computer programming.

At 1204, fields of the template are populated with parameters corresponding to components and/or acts that are to be represented by the HMI object. For instance, fields can be populated with parameters such as adjacent components, operating speed, or any other parameter relevant to an act and/or process. Upon population of requisite fields, at 1206, the template can be named and stored as a HMI object for later editing and/or utilization (e.g., the created HMI object can be employed in connection with disparate HMI objects to create an arrangement representing a system and/or method).

Figure 13:
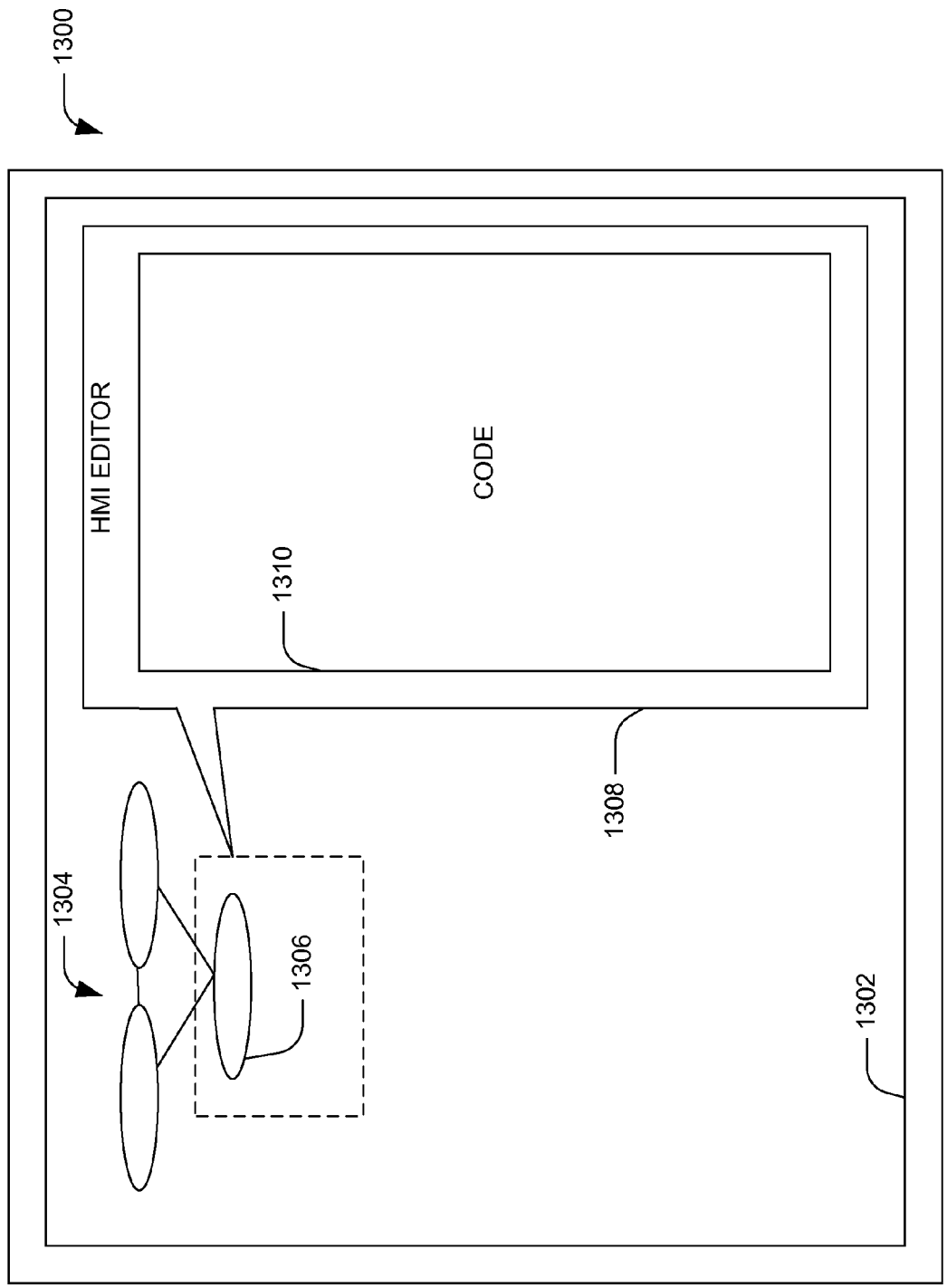
FIG. 13 is an exemplary graphical display illustrating HMI object editing in accordance with an aspect of the present invention.

Regarding FIG. 13, an exemplary graphical display 1300 facilitating editing of an existing HMI object is illustrated. The display 1300 comprises an arrangement region 1302, wherein HMI objects representing components and/or acts can be arranged to represent a system and/or process. Arrangement region 1302 comprises an assemblage 1304 of a plurality of HMI objects representing a system and/or process. The assemblage 1304 includes a HMI object 1306 that is desirably edited by an operator. Upon selecting the HMI object 1306 via any suitable selecting means, a HMI editor 1308 can be provided.

The HMI editor 1308 comprises alterable code 1310 underlying the selected HMI object 1306, thus enabling an operator sufficiently skilled in computer programming to modify an existing HMI object 1306 in an instance in which a component and/or act represented by the HMI object 1306 has been altered or replaced. For example, a component within a system can be replaced by a similar component possessing ability to operate at a greater velocity. Enabling editing of the HMI object within the assemblage 1304 allows an operator to modify control of a system and/or process without having to redesign the entire system. Furthermore, the edited HMI object 1306 can be stored in a library comprising disparate HMI objects for later utilization and/or editing. For example, the edited HMI object 1306 can be employed in conjunction with differing HMI objects to create an assemblage of HMI objects representing a system and/or method. Such assemblage can be delivered to a code generator (not shown) for creating control code that governs actions of individual components within a system and/or process.

Figure 14:
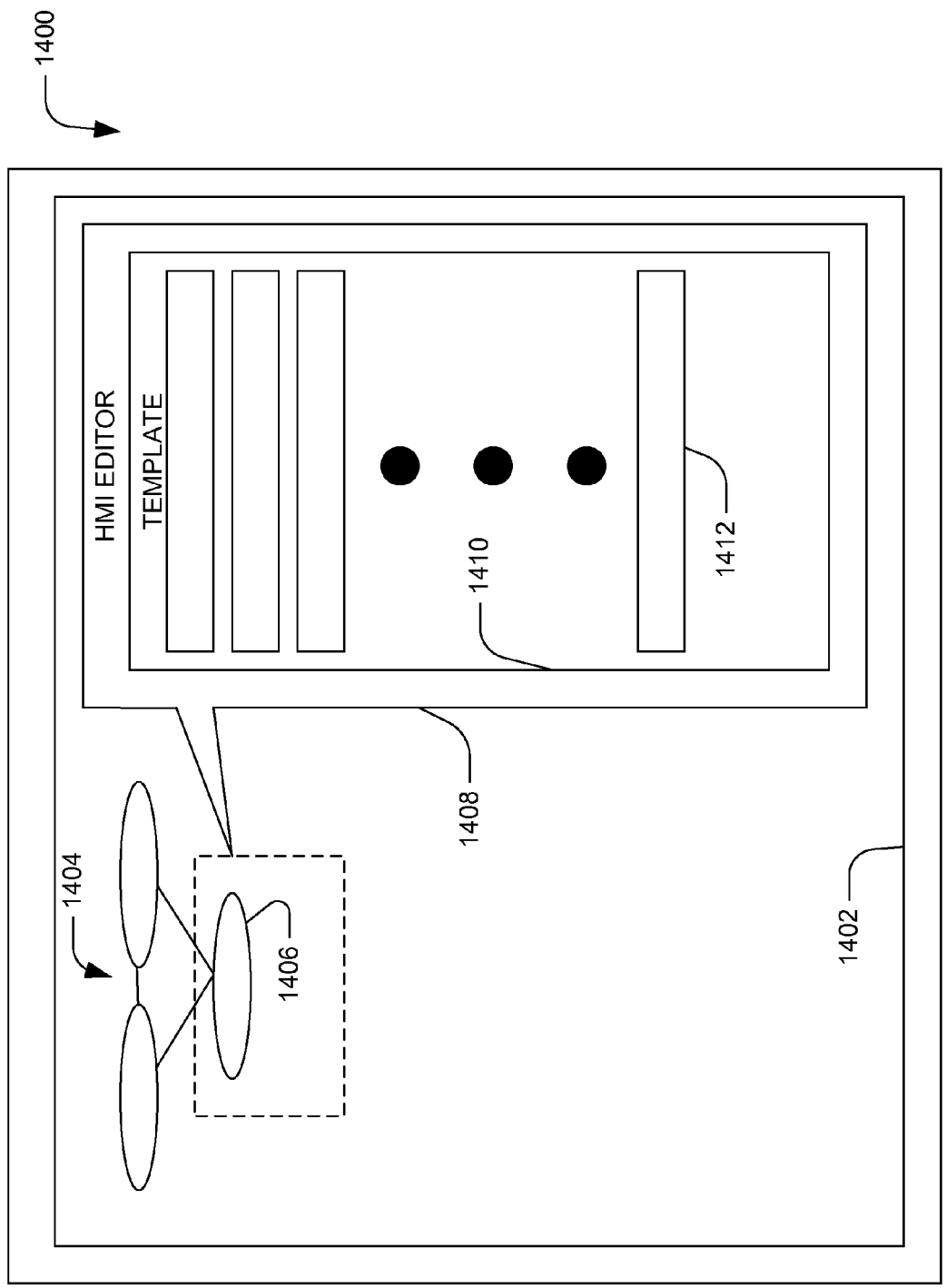
FIG. 14 is an exemplary graphical display illustrating HMI object editing in accordance with an aspect of the present invention.

Referring now to FIG. 14, an exemplary graphical display 1400 facilitating editing of a HMI object via a template is illustrated. Display 1400 comprises an arrangement region 1402, wherein HMI objects representing components and/or acts can be arranged to represent a system and/or process. Arrangement region 1402 comprises an assemblage 1404 of a plurality of HMI objects representing a system and/or process. The assemblage 1404 includes a HMI object 1406 that is desirably edited by an operator. Upon selecting the HMI object 1406 via any suitable selecting means, a HMI editor 1408 can be provided.

The HMI editor 1408 comprises a template 1410, wherein the template 1410 includes a plurality of modifiable fields 1412 populated with parameters corresponding to a component and/or act represented by the HMI object 1406. An operator can modify entries within the fields 1412 analogous to parameter variations of components and/or acts (e.g., a component is replaced by a similar component with disparate parameters). The template 1410 facilitates editing of the HMI object 1406 by an operator lacking skill in computer programming, thereby mitigating expenses incurred via hiring of expert computer programmers. Furthermore, the edited HMI object 1406 can be named and stored in a HMI object library (not shown) for later editing and utilization. For example, several substantially identical obsolete components within a system can be replaced with updated components. Storing an edited HMI object representing such updated components only requires editing the HMI object a single time —thereafter the edited component can simply be selected from a HMI object library and inserted into a HMI object assemblage (representing a system and/or process).

In accordance with another aspect of the present invention, rather than providing fields 1412 to edit the template 1410, graphical components (not shown) can be provided to facilitate editing of the template 1412. For instance, a user can control an output HMI object graphically as well as parametrically (e.g., visual aspects of a resulting HMI object, such as size, shape, and color, can be determined). Furthermore, sequencing of an operation defined by the template 1410 can be modified graphically. The template 1410 can also be edited to effectuate "nesting" of other templates into the template 1410. For example, links or other references can be embedded to other templates can be embedded into the template 1410, thereby facilitating creation of complex arrangements of HMI objects to be created via arranging multiple, simple templates.

HMI objects created from the template 1410 and/or the template 1410 can comprise a historical component (not shown) that links the HMI object to the template 1410 utilized to create such HMI object. Thereafter, modifications to the template 1410 can be propagated to HMI objects created via the template 1410. Thus, numerous HMI objects can be updated by simply modifying the template 1410. It is to be understood, however, that the historical component can be enabled and/or disabled in individual HMI objects and/or individual templates.

Figure 15:
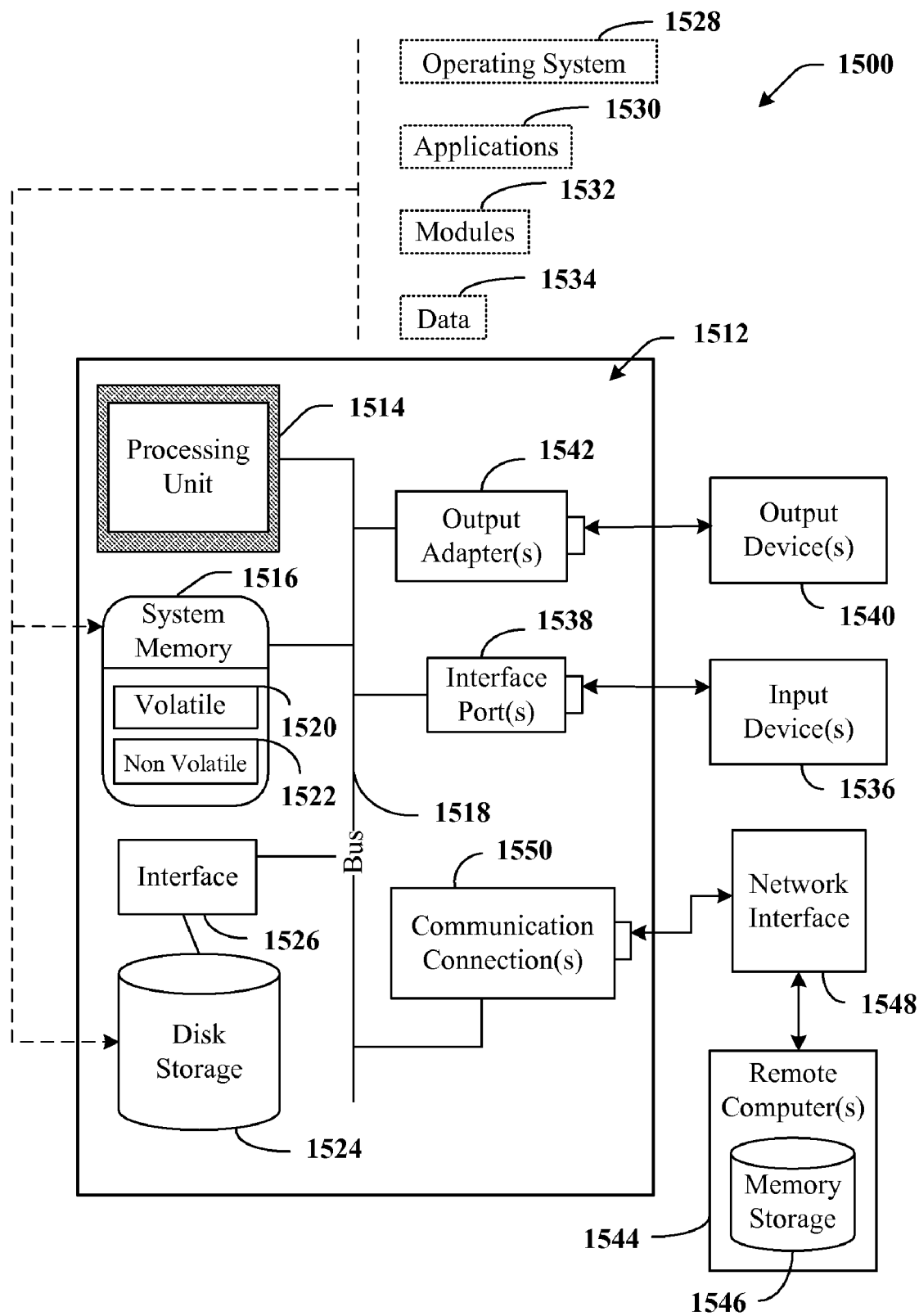
FIG. 15 illustrates an example operating environment in which the present invention may function.
Figure 16:
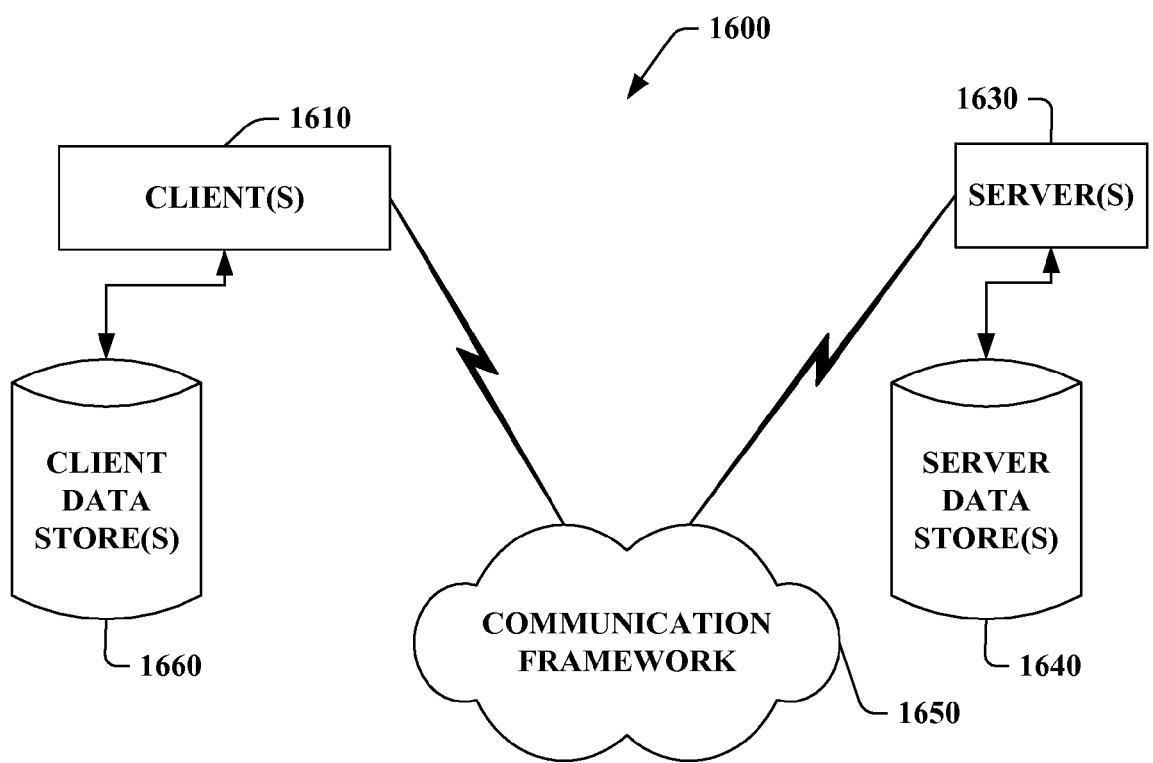
FIG. 16 is a schematic block diagram of a sample-computing environment with which the present invention can interact.

In order to provide a context for the various aspects of the invention, FIGS. 15 and 16 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 15, an exemplary environment 1500 for implementing various aspects of the invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), IEEE 1394, Advanced Graphics Port (AGP), Personal Computer Memory Card International Association bus (PCMCIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM).

Computer 1512 also includes removable/non-removable, volatile/non-volatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), DVD recordable drive (DVD-R), DVD rewritable drive (DVD-RW), and any other suitable DVD drives. To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1500. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the present invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, a universal serial bus (USB), an IEEE 1394 port, and a Small Computer Systems Interface (SCSI) port. Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample-computing environment 1600 with which the present invention can interact. The system 1600 includes one or more client(s) 1610. The client(s) 1610 can be hardware and/or software (e.g., threads, processes, computing devices). The system 1600 also includes one or more server(s) 1630. The server(s) 1630 can also be hardware and/or software (e.g., threads, processes, computing devices). The servers 1630 can house threads to perform transformations by employing the present invention, for example. One possible communication between a client 1610 and a server 1630 may be in the form of a data packet adapted to be transmitted between two or more computer processes. The system 1600 includes a communication framework 1650 that can be employed to facilitate communications between the client(s) 1610 and the server(s) 1630. The client(s) 1610 are operably connected to one or more client data store(s) 1660 that can be employed to store information local to the client(s) 1610. Similarly, the server(s) 1630 are operably connected to one or more server data store(s) 1640 that can be employed to store information local to the servers 1630.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates generation of code from a HMI (Human Machine Interface) representation of objects in an industrial automation environment, the system comprising a program stored on a computer readable medium, the program when executed by the computer causes the computer to execute code for:
   a component that analyzes the HMI representation of objects, each object that comprises the HMI representation is dynamically subsumable into other objects included in the HMI representation to form distinct HMI objects that include features of both subsumed objects, the analysis based at least in part on relatedness of each object that comprises the HMI representation and a feasibility determination for implementing the HMI representation;

a historical component that links the HMI objects to templates used to create them, the system propagates changes made to the templates through at least a subset of the HMI objects;

a component that generates an arrangement of the HMI objects based upon at least one of user characteristics, user context, or prior arrangements made by a user; and a code generation component that generates code based at least upon the analyzed HMI objects.

2. The system of claim 1, the code being control code that governs actions of industrial components.

3. The system of claim 1, the code being at least one of ladder diagrams, function block diagrams, structured text, instruction lists, or sequential function charts.

4. The system of claim 1, the code relayed to at least one industrial component comprising a processing device.

5. The system of claim 4, the processing device being a programmable logic controller.

6. The system of claim 1, further comprising a library of disparate HMI objects.

7. The system of claim 6, the HMI representation of objects comprises one or more HMI objects of the library.

8. The system of claim 1, further comprising an editing component that enables editing of the HMI representation of objects.

9. The system of claim 8, the editing component comprising a modifiable template.

10. A HMI comprising the system of claim 1.

11. The system of claim 10, the HMI being a fixed HMI.

12. The system of claim 10, the HMI being a tethered HMI.

13. The system of claim 10, the HMI being a wireless HMI.

14. The system of claim 1, the code generation component comprises an intelligent component that automatically generates code of a program language desired by a user.

15. The system of claim 1, the code generation component comprises an intelligent component that automatically compiles code in an executable code format according to a processing device that receives the executable code.

16. The system of claim 1, the code generation component outputs control code in a universal language, the control code automatically translated to a program language desired by a user by a first intelligent component, and the control code compiled into an executable code format according to a processing device that receives the executable code.

17. A system that facilitates industrial automation, the system comprising a program stored on a computer readable medium, the program when executed by the computer causes the computer to execute code for:

one or more HMI (Human Machine Interface) objects, the one or more HMI objects subsumable based at least in part on a compatibility between two or more HMI objects, representing at least one of
an industrial component; and
an industrial action;

an arrangement of one or more HMI objects that represent at least one of
an industrial system comprising at least one industrial component; and
an industrial process comprising at least one industrial action;

the arrangement generated based upon at least one of user characteristics, user context, or prior arrangements generated by a user;

a historical component that links the HMI objects to templates used to create them, the system propagates changes made to the template through at least a subset of the HMI objects; and a code generation component that generates code based at least in part upon the arrangement of HMI objects and an associative relationship between each of the one or more HMI objects that comprise the arrangement, the associative relationship is based at least in part on a feasibility determination for associating each of the one or more HMI objects.

18. The system of claim 17, further comprising an editing component that enables editing of the one or more HMI objects.

19. The system of claim 18, the editing component comprising a modifiable template.

20. The system of claim 18, the editing component facilitating multi-user development.

* * * * *